US010309588B2

(12) United States Patent
Tyukhova et al.

(10) Patent No.: US 10,309,588 B2
(45) Date of Patent: Jun. 4, 2019

(54) LUMINAIRES WITH TRANSITION ZONES FOR GLARE CONTROL

(71) Applicant: ABL IP Holding LLC, Decatur, GA (US)

(72) Inventors: Yulia Tyukhova, Santa Clara, CA (US); Jon Eric Gibson, Covington, GA (US); John Bryan Harvey, Newark, OH (US); Jie Chen, Snellville, GA (US); Craig Eugene Marquardt, Covington, GA (US); Daniel Vincent Sekowski, Loganville, GA (US)

(73) Assignee: ABL IP Holding LLC, Atlanta, GA (US)

( * ) Notice: Subject to any disclaimer, the term of this patent is extended or adjusted under 35 U.S.C. 154(b) by 21 days.

(21) Appl. No.: 15/674,797

(22) Filed: Aug. 11, 2017

(65) Prior Publication Data
US 2018/0045385 A1    Feb. 15, 2018

Related U.S. Application Data

(60) Provisional application No. 62/494,534, filed on Aug. 11, 2016.

(51) Int. Cl.
*H05B 33/08*   (2006.01)
*F21K 9/64*    (2016.01)
(Continued)

(52) U.S. Cl.
CPC ............... *F21K 9/64* (2016.08); *F21S 8/086* (2013.01); *F21S 19/005* (2013.01); *F21V 5/04* (2013.01);
(Continued)

(58) Field of Classification Search
CPC ........... F21K 9/64; F21S 8/086; F21S 19/005; F21V 5/04; F21V 7/0083; F21V 7/04;
(Continued)

(56) References Cited

U.S. PATENT DOCUMENTS

| 4,701,832 A | 10/1987 | Lasker |
| 6,550,949 B1 * | 4/2003 | Bauer ................. B60Q 1/0023 362/545 |

(Continued)

FOREIGN PATENT DOCUMENTS

| CN | 201382329 Y | 1/2010 |
| CN | 103775915 A | 5/2014 |

(Continued)

OTHER PUBLICATIONS

Bright View Technologies, "Beam-Mixing LED diffusers, M-series diffusers for downlight, spot, and flood applications", http://www.brightviewtechnologies.com/products/led-diffusers/beam-mixing-led-diffusers/page.aspx?id=1122, 2017, (2 pages).

(Continued)

*Primary Examiner* — Douglas W Owens
*Assistant Examiner* — Syed M Kaiser
(74) *Attorney, Agent, or Firm* — Kilpatrick Townsend & Stockton LLP

(57) ABSTRACT

A luminaire includes a housing, a luminous zone coupled with the housing, and one or more transition zones coupled with the housing and disposed adjacent to the luminous zone. The luminous zone provides a first light to an illuminated area, and the one or more transition zones provide a second light to the illuminated area. The first light is harsher than the second light. A method of illuminating an area includes providing a first light to the area from a luminous zone of a luminaire and providing a second light to the area from one or more transition zones disposed adjacent to the (Continued)

luminous zone within the luminaire. The first light is a harsher light than the second light.

35 Claims, 13 Drawing Sheets

(51) Int. Cl.

| | |
|---|---|
| *F21S 8/08* | (2006.01) |
| *F21V 5/04* | (2006.01) |
| *F21V 7/00* | (2006.01) |
| *F21V 7/04* | (2006.01) |
| *F21V 23/00* | (2015.01) |
| *F21V 8/00* | (2006.01) |
| *H05B 37/02* | (2006.01) |
| *F21S 19/00* | (2006.01) |
| *F21Y 113/20* | (2016.01) |
| *F21Y 115/10* | (2016.01) |
| *F21W 131/103* | (2006.01) |
| *F21W 131/205* | (2006.01) |
| *F21Y 101/00* | (2016.01) |
| *F21Y 105/12* | (2016.01) |

(52) U.S. Cl.
CPC .............. *F21V 7/0083* (2013.01); *F21V 7/04* (2013.01); *F21V 23/003* (2013.01); *G02B 6/004* (2013.01); *G02B 6/0036* (2013.01); *H05B 33/0854* (2013.01); *H05B 33/0872* (2013.01); *H05B 37/0218* (2013.01); *H05B 37/0281* (2013.01); *F21W 2131/103* (2013.01); *F21W 2131/205* (2013.01); *F21Y 2101/00* (2013.01); *F21Y 2105/12* (2016.08); *F21Y 2113/20* (2016.08); *F21Y 2115/10* (2016.08)

(58) Field of Classification Search
CPC ..... F21V 23/003; G02B 6/0036; G02B 6/004; H05B 33/0872; H05B 37/0218; H05B 37/0281
See application file for complete search history.

(56) References Cited

U.S. PATENT DOCUMENTS

| | | |
|---|---|---|
| 6,767,114 B2 | 7/2004 | Young |
| 7,628,508 B2 | 12/2009 | Kita et al. |
| 7,909,479 B2 | 3/2011 | Rooymans |
| 7,931,517 B2 | 4/2011 | Yang et al. |
| 8,033,706 B1* | 10/2011 | Kelly ................... G02B 6/0036 362/307 |
| 8,136,969 B2 | 3/2012 | Burkett |
| 8,267,541 B2 | 9/2012 | Watanabe et al. |
| 8,308,318 B2 | 11/2012 | Maxik |
| 8,491,153 B2 | 7/2013 | Maxik |
| 9,638,397 B2 | 5/2017 | Zhu et al. |
| 9,655,191 B2 | 5/2017 | Vissenberg et al. |
| 2009/0134775 A1* | 5/2009 | Watanabe ............. C04B 35/581 313/503 |
| 2009/0231845 A1 | 9/2009 | Lee |
| 2012/0038291 A1 | 2/2012 | Hasnain |
| 2012/0206050 A1* | 8/2012 | Spero .................. B60Q 1/04 315/152 |
| 2012/0224364 A1* | 9/2012 | Mizuta .................... F21S 8/04 362/231 |
| 2012/0319616 A1* | 12/2012 | Quilici ................. F21V 5/007 315/294 |
| 2014/0118384 A1* | 5/2014 | Buckley ............... G09G 3/3413 345/589 |
| 2015/0055371 A1 | 2/2015 | van de Ven et al. |
| 2015/0167930 A1 | 6/2015 | Zhu et al. |
| 2015/0184837 A1 | 7/2015 | Zhang et al. |
| 2015/0253487 A1* | 9/2015 | Nichol ................. G02B 6/0036 362/610 |
| 2015/0267910 A1 | 9/2015 | Lazalier |
| 2015/0300602 A1 | 10/2015 | Van Bommel et al. |
| 2015/0330588 A1 | 11/2015 | Snyder et al. |
| 2015/0342696 A1* | 12/2015 | Himeno ................. A61B 90/30 362/231 |
| 2016/0113087 A1* | 4/2016 | Tischler ............. H01L 23/4985 315/151 |
| 2016/0320016 A1 | 11/2016 | Dedick |

FOREIGN PATENT DOCUMENTS

| | | |
|---|---|---|
| CN | 203615247 U | 5/2014 |
| DE | 102008027909 A1 | 4/2010 |
| DE | 102012005481 A1 | 9/2013 |
| EP | 1248033 | 10/2002 |
| EP | 1568934 A1 | 8/2005 |
| EP | 2426716 A2 | 3/2012 |
| EP | 2495487 A1 | 9/2012 |
| JP | 2009032483 A | 2/2009 |
| JP | 2010153044 A | 7/2010 |
| JP | 2013008473 A | 1/2013 |
| WO | 2009045223 A1 | 4/2009 |
| WO | 2011004278 A1 | 1/2011 |

OTHER PUBLICATIONS

Bright View Technologies, "Glare control diffusers: G-Series glare control and gain diffusers", http://www.brightviewtechnologies.com/products/light-management/glare-control-diffusers/page.aspx?id=1132, 2017, (4 pages).
Brightgreen, "Brightbits:How to reduce glare by choosing the right LED downlight", https://brightgreen.com/video/brightbits-how-to-reduce-glare-by-choosing-the-right-led-downlight, 2017, (6 pages).
Chiang et al., "Design and demonstration of high efficiency antiglare LED luminaires for indoor lighting", Opt. Express, vol. 23, No. 3, A15-A26, Feb. 9, 2015, (12 pages).
Ephesus Lighting, "LED lighting technology for high-definition broadcasting and glare free lighting", http://ephesuslighting.com/innovation-technology/#rolloverG, 2017, (6 pages).
Hopkinson, "Evaluation of glare", Illuminating Engineering 52, pp. 305-316, Jun. 1957, (12 pages).
Intra Lighting, "Canvas recessed, ceiling and suspended LED luminaire", http://www.intralighting.comffiles/userfiles/download/PRODUCT_PRESENTATION/canvas_designplus.pdf, 2014, (3 pages).
Moreno et al., "Modeling LED street lighting", Applied optics, vol. 53 No. 20, pp. 4420-4430, Jul. 3, 2014 (11 pages).
Osram Lighting Solutions, "DL 30: Technology", https://www.osram.com/ls/highlight-products/dl30-led/technology/index.jsp, 2017, (2 pages).
Osram, "Light is economical: Siteco Streetlight 10 LED", http://www.siteco.com/fileadmin/downloads/product_brochures/outdoor/SL10_2016_EN.pdf, 2016, (19 pages).
Pan et al., "Integration of non-lambertian LED and reflective optical element as efficient street lamp", Optics Express, vol. 18, No. S2, A221-A230, Jun. 21, 2010, (10 pages).
Sweater-Hickcox et al., "Effect of different coloured luminous surrounds on LED discomfort glare perception," Lighting Research and Technology 2013; 45: 464-475, Dec. 18, 2012, (12 pages).
Extended European Search Report for European Application No. EP 17186053.9, dated Nov. 30, 2017, 11 pages.
European Application No. 17186053.9, Office Action dated Jan. 4, 2019, 7 pages.

* cited by examiner

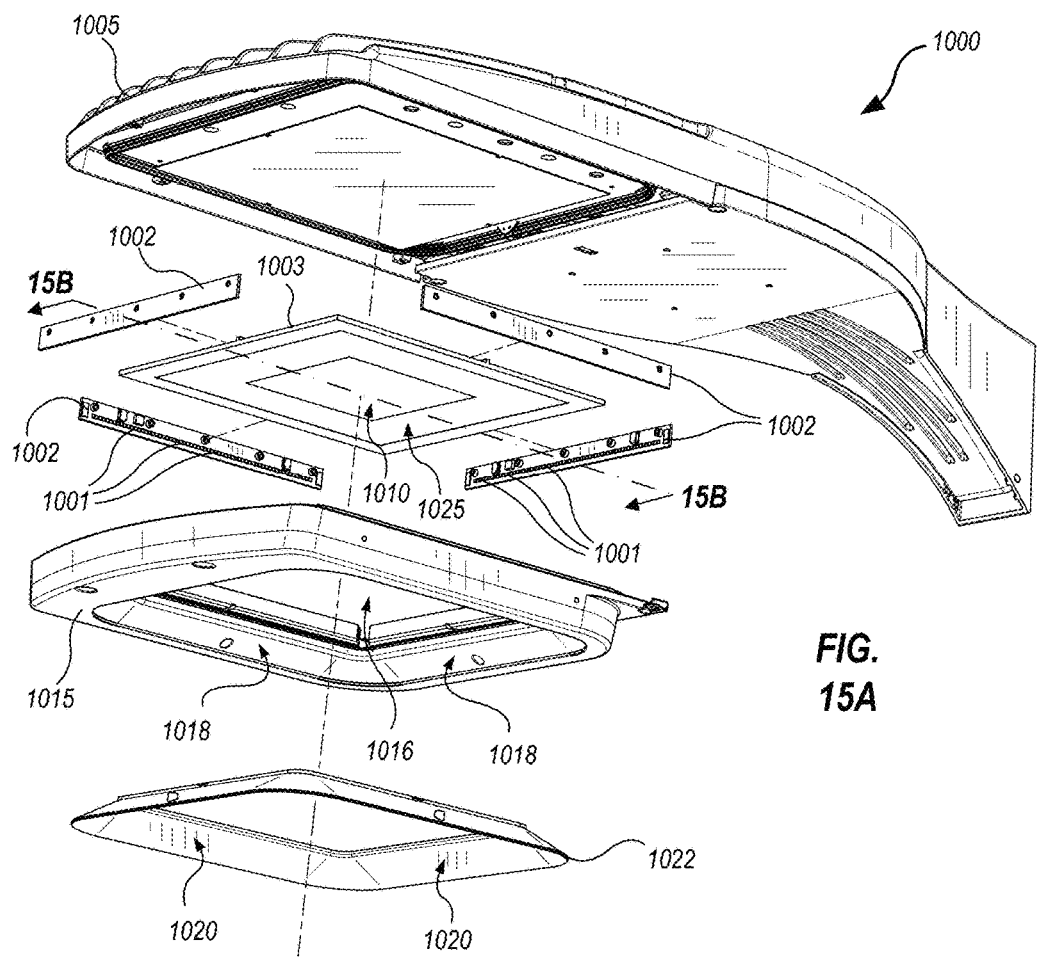
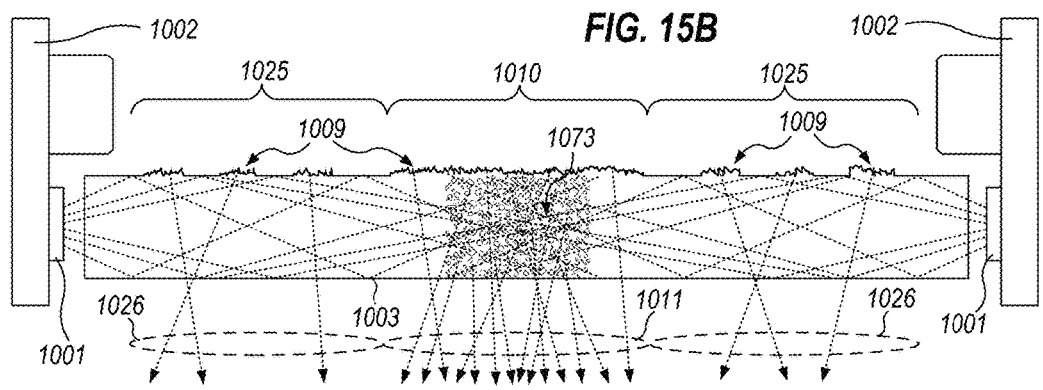

ially iden-# LUMINAIRES WITH TRANSITION ZONES FOR GLARE CONTROL

CROSS-REFERENCE TO RELATED APPLICATIONS

This application is a non-provisional application of, and claims benefit of priority to, U.S. Provisional Patent Application Ser. No. 62/494,534, filed 11 Aug. 2016, which is incorporated herein in its entirety for all purposes.

FIELD

Embodiments of the present invention relate to a luminaire designed to reduce the perception of glare by an observer during use.

BACKGROUND

Luminaires typically include one or more light emitters accompanied by optional optical enhancements (reflectors, lenses, diffusers, etc.) to control the directionality and/or appearance of the light as it exits the luminaire. These light emitters and optional optics are typically housed in a luminaire housing that can take on a variety of different shapes, sizes, and other geometries.

Luminaires sometimes provide a bright area on the fixture from which light emanates, that can be in stark contrast to the lighting environment surrounding the luminaire. For example, an outdoor luminaire illuminated at night may provide a bright area that is in high contrast to the dark night sky. This contrast increases the glare perception of an observer.

SUMMARY

Certain embodiments of the present invention provide a luminaire designed to reduce the likelihood of glare perception through the use of reflectors and/or dynamic control of light emitters therein.

In an embodiment, a luminaire includes a housing, a luminous zone coupled with the housing, and one or more transition zones coupled with the housing and disposed adjacent to the luminous zone. The luminous zone provides a first light to an illuminated area, and the one or more transition zones provide a second light to the illuminated area. The first light is harsher than the second light.

In another embodiment, a method of illuminating an area includes providing a first light to the area from a luminous zone of a luminaire and providing a second light to the area from one or more transition zones disposed adjacent to the luminous zone within the luminaire. The first light is a harsher light than the second light.

The terms "invention," "the invention," "this invention" and "the present invention" used in this patent are intended to refer broadly to all of the subject matter of this patent and the patent claims below. Statements containing these terms should not be understood to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this patent, all drawings and each claim.

BRIEF DESCRIPTION OF THE DRAWINGS

Embodiments are described in detail below with reference to the following figures, in which like numerals within the drawings and mentioned herein represent substantially identical structural elements.

FIG. 15A illustrates, in an exploded view, some elements of a luminaire with transition zones for glare control, that uses a waveguide to capture light from light emitters, in accord with an embodiment.

FIG. 15B is a cross-sectional detail of certain ones of the PCBs and light emitters, and the waveguide, illustrated in FIG. 15A.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Disclosed herein are luminaires that include light emitters provided in a housing so as to emit light from a luminous zone. The luminaire housing can be of any shape or size. The luminous zone of the luminaire can also be of any two- or three-dimensional shape (rectilinear, circular, oval, etc.) or size. One or more lenses may be positioned in the housing, through which light from the light emitters exits the luminaire. The one or more lenses can be formed of any suitable material, including glass, polymers (e.g., acrylics, silicones, polycarbonates, etc.) other optical materials, and/or combinations thereof. The lens can be flat, curved (e.g., convex, concave, etc.) and have any geometry or shape. The lens may be provided with smooth surfaces but surface enhancements and/or coatings may also be provided on the lens depending on a desired light emission from the luminaire. In particular, interior or exterior surfaces of a lens may be formed so as to diffuse light passing therethrough, to reduce glare from light emitters and provide the appearance of an illuminated area rather than individual sources. These and other lens features are discussed below, at least in connection with FIGS. 10-13.

Figure 1:
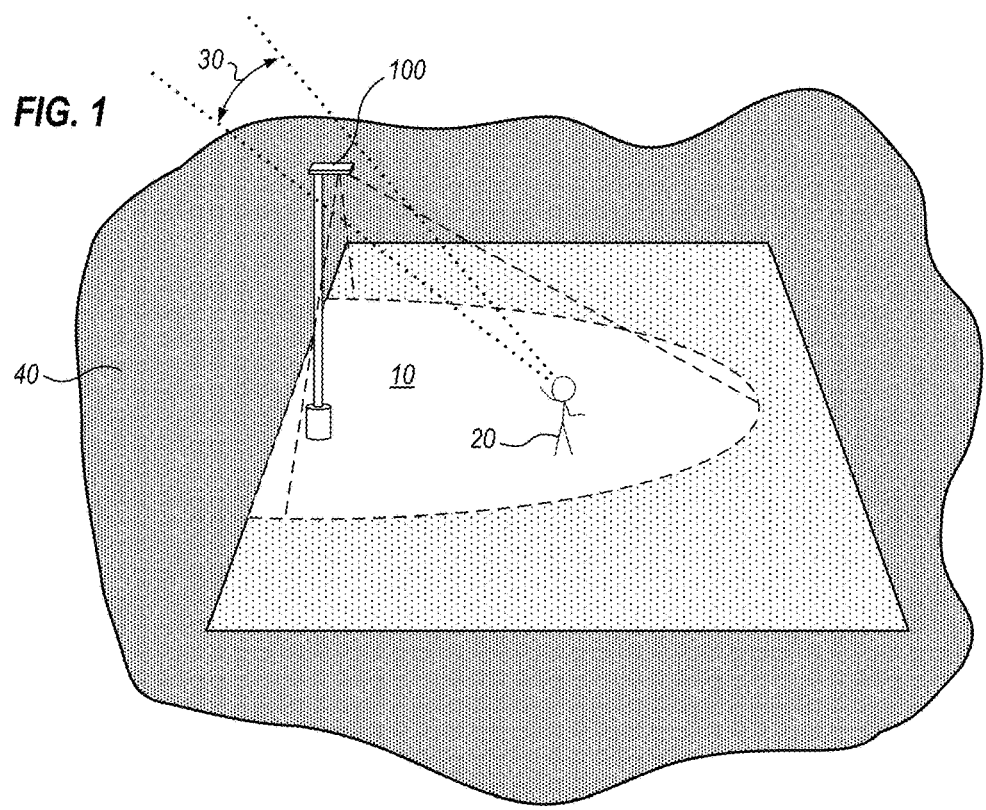
FIG. 1 illustrates a luminaire having a transition zone for glare control, providing light to an illuminated area where a viewer is located, in accord with an embodiment.
Figure 2:
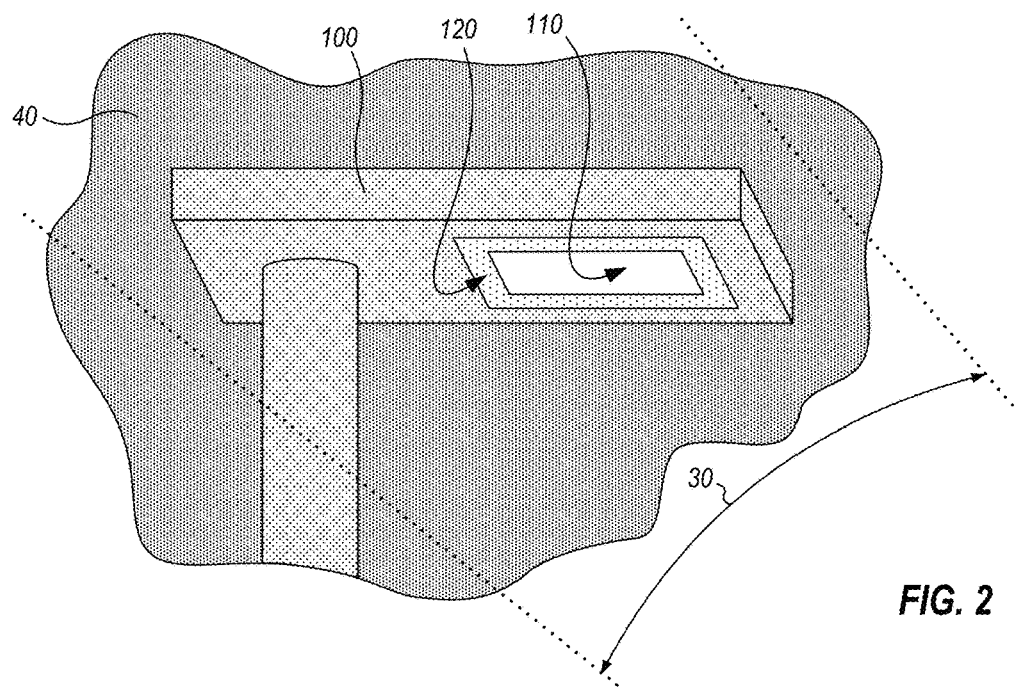
FIG. 2 illustrates the luminaire of FIG. 1 as including a luminous zone, and a transition zone that surrounds the luminous zone, in accord with an embodiment.

For example, FIGS. 1 and 2 illustrate a luminaire 100 with a transition zone 120 for glare control. Luminaire 100 provides light to an illuminated area 10 that may be, for example, an outdoor area, but luminaires herein can be used to provide light to any indoor or outdoor area. Luminaire 100 is illustrated as a pole-mounted fixture, but luminaires herein may be stand-alone devices or may be mounted to other objects including indoor or outdoor objects, or natural features. In FIG. 1, luminaire 100 is illustrated as providing light to illuminated area 10 where a viewer 20 is located. Viewer 20 can look upwardly and see luminaire 100 within a field of view 30. In FIG. 2, luminaire 100 is shown in field of view 30 from a perspective of viewer 20, that is, looking upwardly at luminaire 100. Luminaire 100 includes a luminous zone 110, and a transition zone 120 that surrounds luminous zone 110, as seen within field of view 30. For purposes of discussing how viewer 20 perceives glare from luminaire 100, illuminated area 10 is shown during nighttime in FIGS. 1 and 2 such that a visual background 40, adjacent to luminaire 100, is dark.

In use, luminaire 100 provides a first light from luminous zone 110 and a second light from transition zone 120. The first light from luminous zone 110 will appear, to viewer 20, as a bright, or at least harsh, spot or area on luminaire 100. However, the second light will appear to viewer 20 as a softer light emanating from a perimeter of luminous zone 110. Thus, transition zone 120 lessens a contrast perceived by viewer 20 between the harsh light emanating from luminous zone 110, and visual background 40 (e.g., dark night sky), effectively reducing the perceived glare to viewer 20.

It should be understood that a variety of factors can be associated with light from a luminous zone being harsher than light from a transition zone. When the net light output from the luminous zone (e.g., luminous flux emitted by the luminous zone integrated over its surface area) is greater than the net light output from the transition zone, the light from the luminous zone may be considered harsher. Or, when the luminous flux per unit area emitted by the luminous zone is greater than the luminous flux per unit area emitted by the transition zone, the light from the luminous zone may also be considered harsher. Or, when the luminous fluxes per unit area emitted by the luminous zone and the transition zone are about the same, but a chromaticity of the transition zone is of a lower correlated color temperature than a chromaticity of the luminous zone, again, the light from the luminous zone may also be considered harsher, as discussed further below.

The transition provided by transition zone 120 may be one or more discrete steps in brightness relative to luminous zone 110, a gradient, or a combination of one or more steps and one or more gradients. Chromaticity of light from transition zone 120 may also differ from chromaticity of light from luminous zone 110; specifically, transition zone 120 may emit light that is softer in the sense of being less harsh to look at. For example, luminous zone 110 may emit light with high energy spectral components, such as toward the blue end of the visible spectrum (e.g., "cool white" light with a color temperature of 4000K-6000K), while transition zone 120 may emit light with more low energy spectral components such as toward the red end of the spectrum (e.g., "warm white" light with a color temperature of 2500K-3500K). Combinations of these techniques may also be utilized. In this way, transition zones may be designed to create an appearance of gradual light transition from a bright or harsh luminous zone, through a "gentler" transition zone, to a surrounding environment. Or, a stepped transition may be created such that the demarcation between the luminous zone and one or more transition zone(s) is readily apparent.

In embodiments, transition zones can be of any size, shape or number of dimensions, although transition zones that surround a luminous zone, from the vantage point of a viewer, may be advantageous. Transition zones are not limited to shapes that match the shapes or number of dimensions of luminous zones, or vice versa. For example, in embodiments a round, square or other polygonal, two-dimensional transition zone might surround a round, square or other polygonal, two-dimensional luminous zone (e.g., such as the embodiments described below in connection with FIGS. 7, 8, and 9A through 9C). In other embodiments one or more two-dimensional transition zones of any shape might be flat or curved plane(s) behind one or more three-dimensional luminous zone(s), from the vantage point of the viewer. In still other embodiments, a three-dimensional transition zone might surround a two-dimensional luminous zone (e.g., such as the embodiments described below in connection with FIGS. 3 and 10-12). In yet more embodiments, a two-dimensional luminous zone will be disposed coplanar with a first, two-dimensional transition zone, with another, three-dimensional transition zone surrounding them, as described below in connection with FIGS. 4-6, 15A and 15B. Furthermore, in any of these cases, operation of light emitters can be selectively modified to reshape boundaries of a luminous zone with an adjacent transition zone, as described in connection with FIGS. 9A through 9C and FIG. 17. Upon reading and understanding the present disclosure, one skilled in the art will readily conceive many equivalent and intermediate structures and geometries for luminous zones and transition zones, and all such equivalent and intermediate structures and geometries should be considered within the scope of the present disclosure.

Transition zone 120 can be provided by reflectors or by other optical mechanisms, as discussed below. For example, some of the emitted light may be reflected by reflector(s) surrounding the luminous zone 110. Herein, a "reflector" is any surface that reflects most of the light incident thereon, but is not limited to high efficiency and/or specular reflectors such as mirrors or polished metal surfaces. Any object made of light colored material can therefore be considered a "reflector." Reflectors may have either a smooth finish so as to produce specular reflection of light, or a finish that scatters the light. The softer second light discussed above is but one modality of transition zone 120 providing a visual transition from luminous zone 110 to visual background 40. In another example, light emitters may provide a first luminous flux density in a luminous zone and a second luminous flux density in a surrounding transition zone, and a diffusing surface may be provided across both the luminous zone and the transition zone, so that the demarcation between the luminous and the transition zone becomes diffused and indistinct. In yet another example, light emitters may provide light in a luminous zone, reflectors surrounding the luminous zone may provide a transition zone, and an outer diffusing surface may be provided across both the luminous zone and the transition zone, so that again, the demarcation between the luminous and the transition zone becomes diffused and indistinct. Size of the transition zone, as well as intensity and/or gradation of the light that appears within the transition zone, can also be controlled, as discussed below.

A variety of artificial light emitters are contemplated herein, including, but not limited to, light emitting diodes ("LEDs"), high intensity discharge ("HID") sources, fluorescent sources, incandescent sources, and combinations of these light emitters. Daylight or sunlight may also be used in some embodiments, such as a skylight about which a transition zone(s) can be created (e.g., see FIGS. 25A and 25B).

In some embodiments, the light emitters are a plurality of LEDs arranged in any number and/or pattern on one or more substrates provided in the housing. The substrates may be printed circuit boards ("PCBs") that are subsequently mounted in the housing. In other embodiments, no PCB is needed; rather, the LEDs are chip-on-board LEDs provided directly on (and/or, even printed on) a substrate. LEDs may be single-die or multi-die LEDs, DC or AC, and/or organic light emitting diodes. White, colored, and/or multicolored LEDs may be used. Phosphors may be provided in LED chip packaging or other portions of products herein to downshift at least a portion of light from LED chips to longer wavelengths. Also, light emitters herein need not all be the same color; rather, mixtures of LEDs and/or other light emitters may be used. Light emitters may be oriented in a fixture to emit light in any orientation, such as downwardly (as suggested by the illustrations of FIGS. 1 and 2), at one or more angles from vertical, upwardly, in any other orientation, and/or combinations thereof. Light travel directions described herein as upwards, downwards, sideways, laterally or any other orientation in the context of a specific luminaire shown in a drawing are for descriptive clarity only. These directions do not limit the luminaire to being installed in the direction shown, or the structures or principles being explained to any particular direction.

In some embodiments the shape and size of the luminous zone is static in that light emitters therein are disposed in fixed locations and are driven at intensities that are either fixed, or that change in unison with one another. An example of a static luminous zone operating with fixed intensity is when a luminaire includes a power supply that either provides power or does not provide power, e.g., the light emitters are either on (at a fixed set of drive conditions) or off. An example of a static luminous zone operating with intensities of light emitters changing in unison with one another is when a luminaire includes a power supply that supplies a single set of drive conditions at any given time (such as drive current, drive voltage, or pulse width modulated power supplied uniformly, to all the light emitters); but, the drive conditions for all the light emitters can change in unison from time to time. For example, the drive conditions for all the light emitters can be modified together through use of a dimming switch or a controller that adjusts pulse with modulation. In such embodiments, transition zones can be arranged either by spatial distribution of the light emitters, and/or by providing one or more reflectors, around at least a portion (if not the entirety) of the perimeter of the luminous zone. The transition zones serve to mitigate the glare of the light emitted from the luminous zone.

Figure 3:
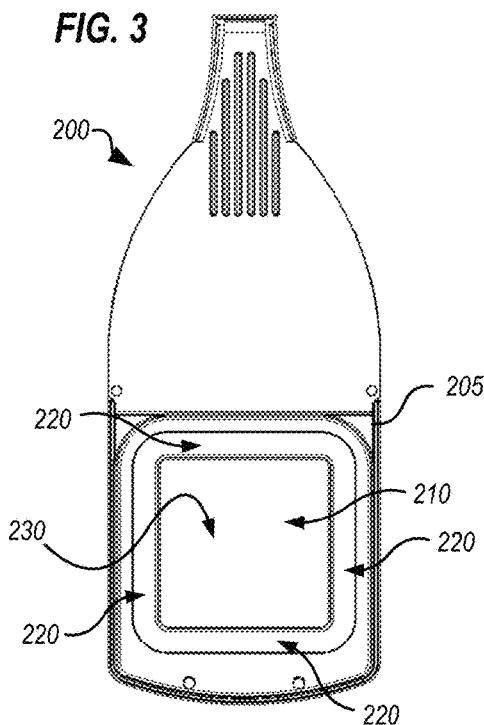
FIG. 3 is a bottom plan view of a luminaire that illustrates use of one or more reflectors to provide a transition zone about a luminous zone, in accord with an embodiment.

FIG. 3 is a bottom plan view of a luminaire 200, illustrating use of one or more reflectors 220 to provide a transition zone about a luminous zone 210. A housing 205 provides mechanical support and protection for luminous zone 210 and reflectors 220. Reflectors 220 are illustrated as a single shaped surface in FIG. 3, but it will be appreciated that reflectors 220 may be fabricated in one or more portions that couple separately with housing 205. In luminaire 200, an optional lens 230 covers luminous zone 210, although lens 230 is not required.

Reflectors 220 may be (but do not have to be) co-planar with the luminous zone 110 (more specifically, with lens 230) but in certain embodiments, reflectors 220 may extend downwardly from the luminous zone 110. In particular, reflectors 220 may couple with housing 205 so as to mechanically support and protect outer edges of lens 230. Reflectors 220 can have any cross-sectional geometry (including flat, concave, convex, parabolic, etc.), can be of any depth, and may have smooth or textured surfaces. The angle at which reflectors 220 extend downwardly from the luminous zone, or the radius of curvature of reflectors 220, can be tailored depending on the application, as discussed below in connection with FIG. 1042 and FIG. 19. Reflectors 220 may be formed of any suitable materials, including metallic and polymeric materials. Exterior surfaces of reflectors 220 may have an extremely high surface reflectivity, for example between 96%-99.5% inclusive, and in some embodiments, preferably 98.5-99%. To achieve the desired reflectivity, in some embodiments reflectors 220 comprise polished metals such as, but not limited to, polished aluminum (such as, for example, Miro® or Miro-Silver® available from Alanod). In other embodiments, reflective coatings, including reflective paints (e.g., white or at least light colored paints) or other reflection-enhancing compositions, are applied to the reflector to attain the desired reflectivity.

Figure 4:
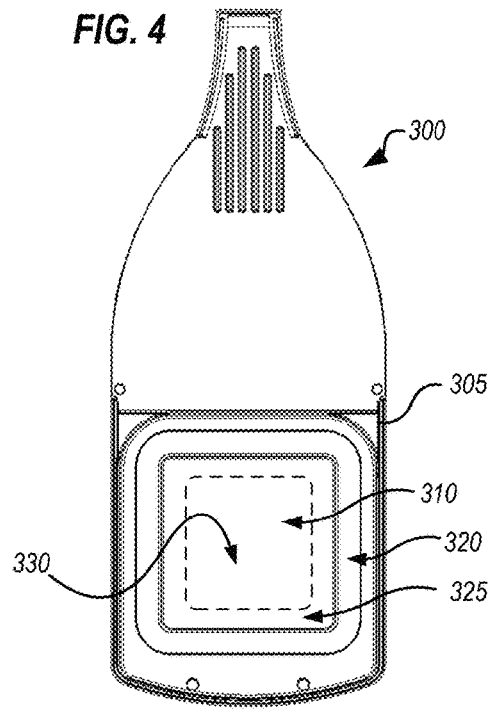
FIG. 4 is a bottom plan view of a luminaire, illustrating a first transition zone and a second transition zone, in accord with an embodiment.

Additional transition zones may also be provided. For example, FIG. 4 is a bottom plan view of a luminaire 300, illustrating a first transition zone 320 and a second transition zone 325. Characterizations of "first," "second" and the like with respect to luminaires or their features are made herein without regard to any particular form function or sequence of the features, but only to designate that they are different in type, shape, number, placement, operating condition, behavior at different points in time, or the like, from one another. Similar to luminaire 200 (FIG. 3), luminaire 300 provides a luminous zone 310 and a first transition zone 320 provided by reflectors that couple with housing 305. Second transition zone 325 forms a frame around, and may be (but does not have to be) coplanar with, luminous zone 310 (more specifically, with lens 330). Second transition zone 325 may be formed, for example, by providing a filtering and/or diffusing film of the desired shape and size on portions of lens 330 that correspond to second transition zone 325. For example, a diffusing film may selectively filter certain wavelengths of light; a diffusing film may also incorporate one or more phosphors to shift at least a portion of the light to longer wavelengths.

Second transition zone 325 may also be formed by a distribution, type and/or drive condition of light emitters behind lens 330. That is, (1) luminous zone 310 may have a high density of light emitters and second transition zone 325 may have a lower density of light emitters; (2) luminous zone 310 may have a first type or mixture of light emitter types and second transition zone 325 may have a second type or mixture of light emitter types; and/or (3) luminous zone 310 may have light emitters driven at a first set of drive conditions, and second transition zone 325 may have a similar type and density of light emitters as luminous zone 310, but driven at a second set of drive conditions that results in lower light output. Yet another way of creating a second transition zone 325 coplanar with luminous zone 310 behind lens 330 is to tailor waveguide scattering and/or emission conditions, as discussed below in connection with FIGS. 16A and 16B. Through any of, or a combination of, these techniques, light emitted from second transition zone 325 may be arranged to appear dimmer and/or "softer" than the light emitted through luminous zone 310.

Figure 5:
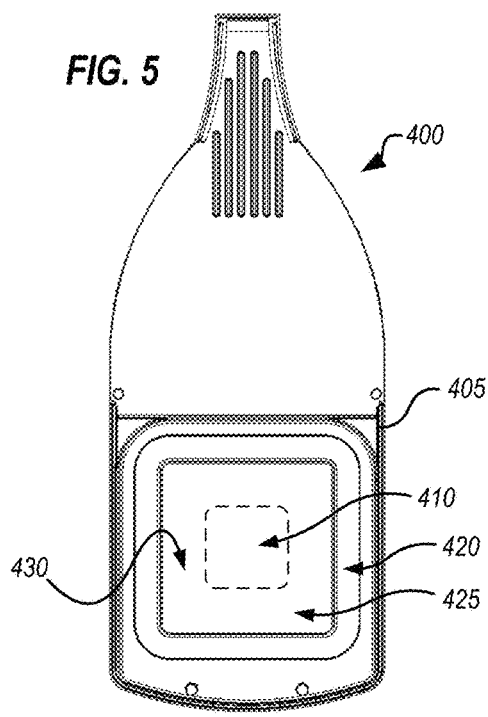
FIG. 5 is a bottom plan view of a luminaire, illustrating a first transition zone and a second transition zone, in accord with an embodiment.

Transition zones of any number, size or shape may be used. For example, FIG. 5 is a bottom plan view of a luminaire 400, illustrating a first transition zone 420 and a second transition zone 425. Similar to luminaires 200 (FIG. 3) and 300 (FIG. 4), luminaire 400 provides a luminous zone 410 and a first transition zone 420 provided by reflectors that couple with housing 405. Second transition zone 425 forms a frame around, and may be (but does not have to be) coplanar with, luminous zone 410 (more specifically, with lens 430). Relative to luminous zone 310 and second transition zone 325 of luminaire 300, luminous zone 410 is smaller, and second transition zone 425 forms a larger width about luminous zone 410.

Figure 6:
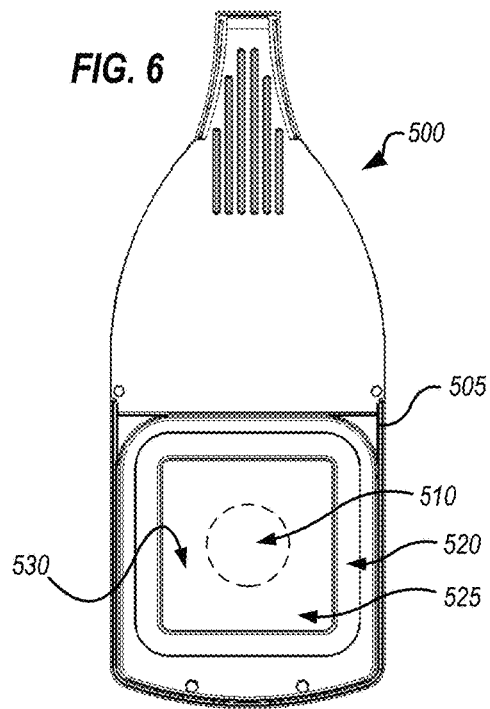
FIG. 6 is a bottom plan view of a luminaire, illustrating a first transition zone and a second transition zone, in accord with an embodiment.

In another example, FIG. 6 is a bottom plan view of a luminaire 500, illustrating a first transition zone 520 and a second transition zone 525. Similar to luminaires 200 (FIG. 3), 300 (FIG. 4) and 400 (FIG. 5), luminaire 500 provides a luminous zone 510 and a first transition zone provided by reflectors 520 that couple with housing 505. Second transition zone 525 forms a frame around, and may be (but does not have to be) coplanar with, luminous zone 510 (more specifically, with lens 530). Luminous zone 510 is a round zone within second transition zone 525. Upon reading and understanding the present disclosure, one skilled in the art will readily conceive many equivalent and intermediate structures and geometries for luminous and transition zones.

Figure 7:
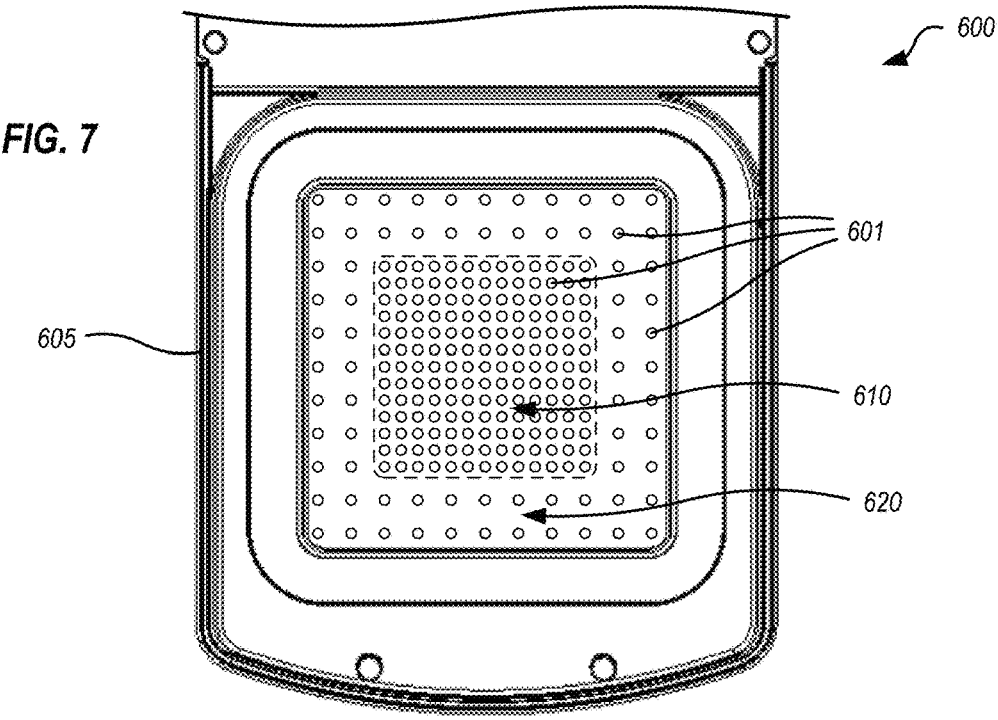
FIG. 7 is a bottom plan view of a portion of a luminaire, illustrating layout of light emitters so as to create a luminous zone and a transition zone, in accord with an embodiment.

FIG. 7 is a bottom plan view of a portion of a luminaire 600, illustrating one embodiment of the layout of light emitters 601 so as to create a luminous zone 610 and a transition zone 620. Light emitters 601 are disposed so as to emit light through an aperture in a housing 605. Density of light emitters 601, and a luminous flux per unit area thus produced, is higher within luminous zone 610. Density of light emitters 601, and a luminous flux per unit area thus produced, is lower within transition zone 620. Luminous zone 610 is shown as square in shape, but this is exemplary only, and as noted above, luminous and/or transition zones may have any shape. Furthermore, although the plan view does not show variations in vertical height from place to place among light emitters 601, it is understood that light emitters 601 forming luminous zone 610 and transition zone 620 may be provided in an arrangement that is flat and level, an arrangement that is flat but at an angle with respect to vertical, or an arrangement that is curved in any concave and/or convex manner.

Figure 8:
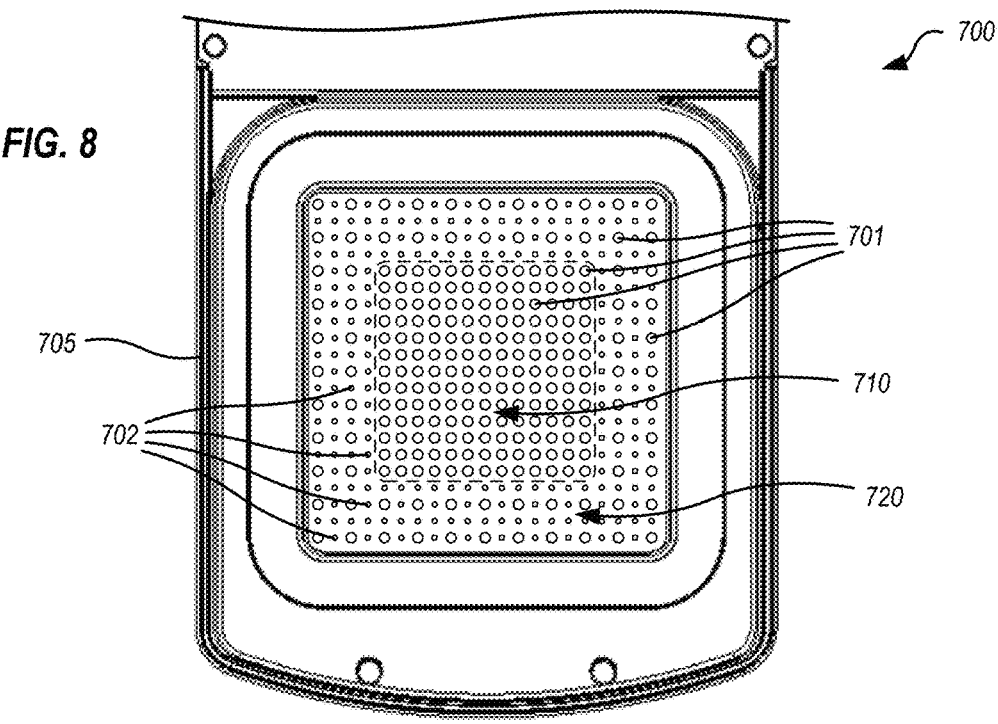
FIG. 8 is a bottom plan view of a portion of a luminaire, illustrating layout of light emitters of two different types so as to create a luminous zone and a transition zone, in accord with an embodiment.

FIG. 8 is a bottom plan view of a portion of a luminaire 700, illustrating layout of light emitters 701 and 702 so as to create a luminous zone 710 and a transition zone 720. Light emitters 701 and 702 are disposed so as to emit light through an aperture in a housing 705. A luminous flux per unit area produced by light emitters 701 is higher within luminous zone 710. Transition zone 720 includes a reduced density of light emitters 701, as well as some light emitters 702 (not illustrated as present within luminous zone 710). Light emitters 702 may vary in terms of total light output, chromaticity, color temperature, response to drive conditions or any other way, as compared with light emitters 701. Thus, luminous flux per unit area is lower within transition zone 720 than within luminous zone 710.

It will be appreciated by one skilled in the art, upon reading and understanding the present disclosure, that many equivalents and variations are possible using the principles demonstrated in FIGS. 7 and 8. For example, although transition zone 720 is shown with a density of light emitters 701 and 702 per unit area that is equal in number to a density of light emitters 701 in luminous zone 710, this is not required. Transition zones may have more or fewer light emitters per unit area than luminous zones. Also, more than two types of light emitters could be utilized, and either transition zones or luminous zones may mix types of light emitters without limitation. Although luminous zone 710 is shown as square in shape, this is exemplary only; as noted above, luminous and/or transition zones may have any shape. Many similar, equivalent and intermediate structures that form luminous zones and transition zones are possible.

In certain embodiments, the luminous zone and/or transition zones are not static. Rather, either the luminous zone and/or one or more transition zone(s), may be created, enlarged or reduced in size by dynamically altering light from light emitters that form the original luminous zone and/or transition zones.

Figure 9A:
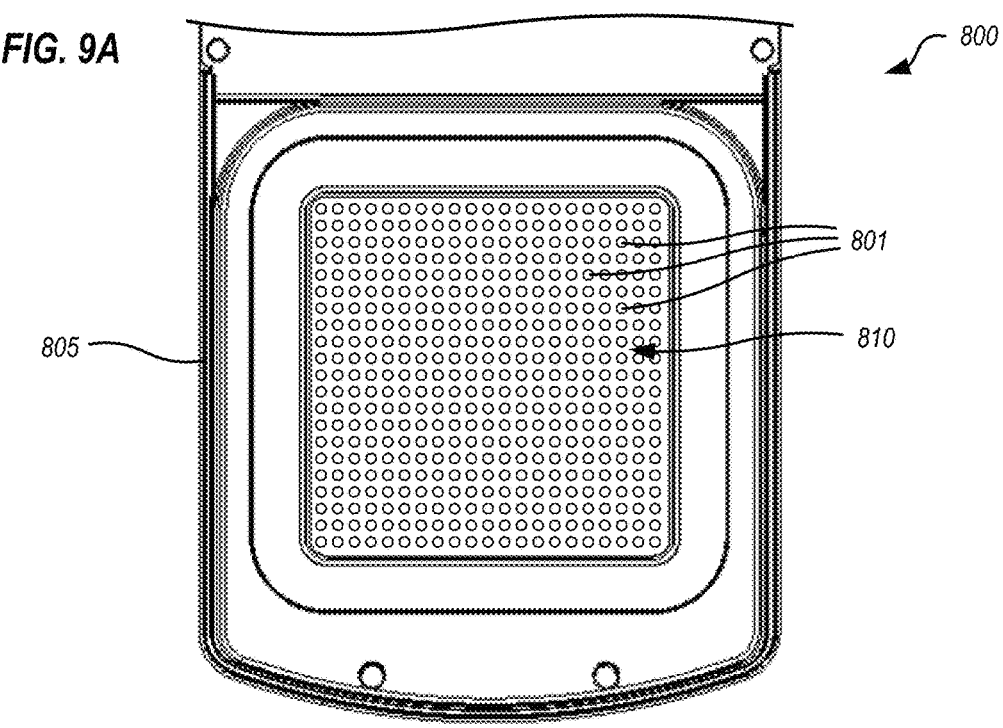
FIG. 9A illustrates a portion of a luminaire at a first time, with light emitters disposed so as to emit light through an aperture of a housing, in accord with an embodiment.
Figure 9B:
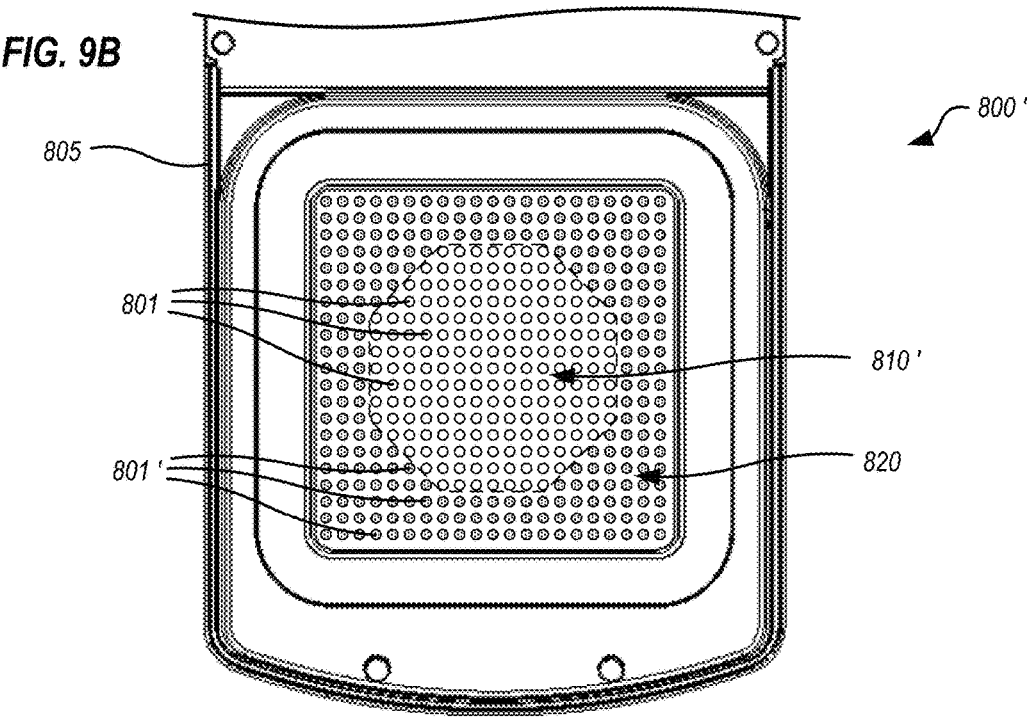
FIG. 9B illustrates the same portion of the luminaire of FIG. 9A at a second time, with only a subset of the light emitters driven at the same drive condition as in FIG. 9A, this subset of light emitters forming a reduced luminous zone, in accord with an embodiment.
Figure 9C:
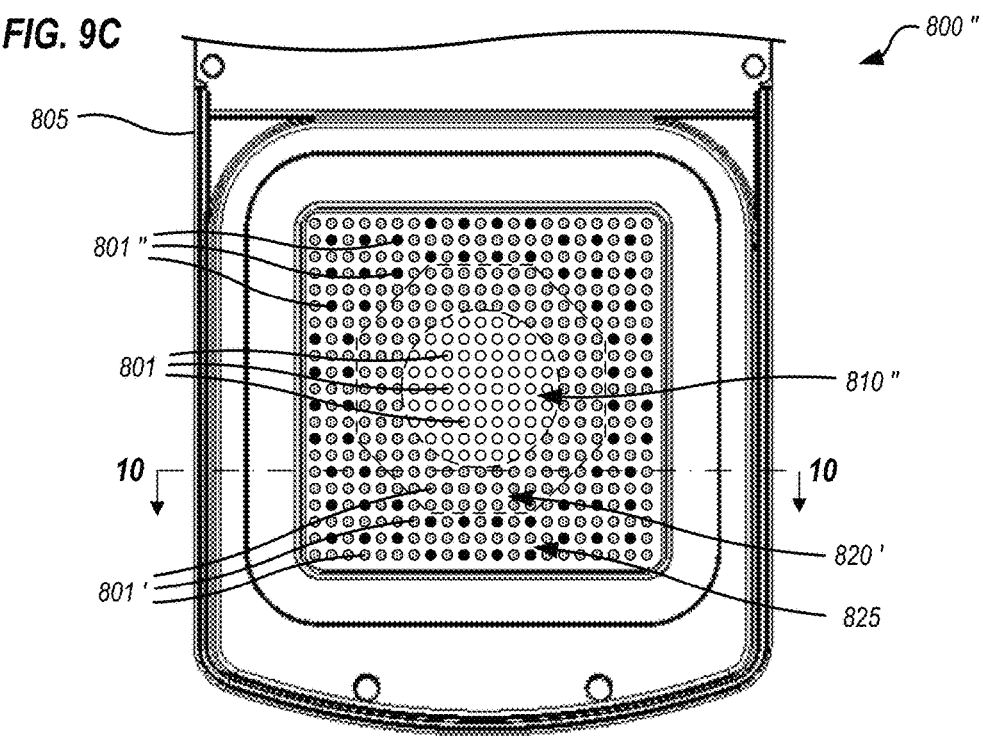
FIG. 9C illustrates the same portion of the luminaire of FIG. 9A at a third time, with a first subset of light emitters driven at the same drive condition as in FIG. 9A, a second subset of light emitters driven at the second drive condition, and a third subset of light emitters turned off, in accord with an embodiment.

FIG. 9A illustrates a portion of a luminaire 800 at a first time, with light emitters 801 disposed so as to emit light through an aperture of a housing 805. At the time illustrated in FIG. 9A, all of light emitters 801 are driven at a first drive condition so as to form a luminous zone 810. FIG. 9B illustrates the same portion of luminaire 800 at a second time (designated as 800'), with only a subset of the light emitters 801 driven at the same drive condition as in FIG. 9A, this subset of light emitters 801 forming a reduced luminous zone 810'. Another subset of the light emitters 801 of luminaire 800 are driven at a second drive condition and designated as 801' so as to form a transition zone 820. FIG. 9C illustrates the same portion of luminaire 800 at a third time (designated as 800"), with a first subset of light emitters 801 driven at the same drive condition as in FIG. 9A, a second subset of light emitters 801 driven at the second drive condition and designated as 801', and a third subset of light emitters 801 turned off and designated as 801". Thus, in FIG. 9C, the driven states of the light emitters 801 form a luminous zone 810", a first transition zone 820' and a second transition zone 825. That is, transition zones 820' and 825 are created by maintaining the intensity of the light emitters more centrally located within the original luminous zone 810, but dimming and/or de-activating the more peripheral light emitters within the original luminous zone 810. That is, an identification of at least a portion of the light emitters is adjustable; a controller (see FIG. 17) can identify certain of the light emitters as light emitters 801 under some conditions, as light emitters 801' under other conditions and as light emitters 801" under other conditions. In this way, the area of the original luminous zone 810 decreases (i.e., becomes a "reduced luminous zone") and is replaced by one or more transition zones 820', 825. Transition zones 820', 825 in such embodiments are created not by reflection or diffusion (as in certain static embodiments) but rather by the dimmed or de-activated light emitters, to provide a visual buffer between the brighter light emitters within the reduced luminous zone and the visual background. It is understood that any number of transition zones may be created by further varying drive conditions of, and/or de-activating, subsets of light emitters.

In FIGS. 9B and 9C, luminous zone 810' is shown as octagonal in shape, luminous zone 810" is shown as round in shape, and a border between transition zones 820' and 825 is shown as octagonal in shape. It should be understood that these shapes are exemplary only; as noted above, luminous and/or transition zones may have any shape. Sight line 10-10 in FIG. 9C indicates a plane of the schematic cross-sectional views shown in FIGS. 10-12; that is, the cross-sections of luminaires 900, 900' and 900" shown in any of FIGS. 10-12 could correspond to a cross-section of luminaire 800" where indicated.

Figure 10:
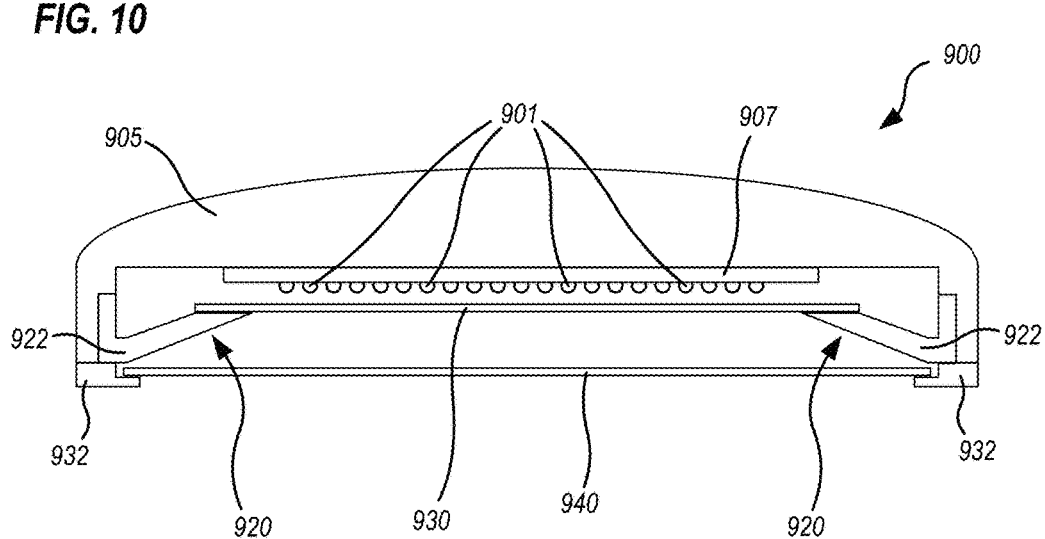
FIG. 10 schematically illustrates, in a cross-sectional view, a luminaire having certain mechanical elements that may be present in the luminaires of any of FIGS. 2 through 9C, in accord with embodiments.

FIG. 10 schematically illustrates, in a cross-sectional view, a luminaire 900 having certain mechanical elements that may be present in luminaires 200, 300, 400, 500, 600, 700, 800, 800' and/or 800". Not all of luminaires 200, 300, 400, 500, 600, 700, 800, 800' and/or 800 will have every feature illustrated in FIG. 10; the features that are present may differ in shape or form from the schematic illustration; and other features may be present, without limitation. Luminaire 900 includes a housing 905 that provides structural support and may include thermal management features (e.g., heat sinking features such as fins or other protrusions to encourage heat transfer to ambient air). Light emitters 901 are coupled with a substrate 907 that may be, for example, a printed circuit board (PCB). An optional first trim ring 922 couples with housing 905 through any mechanical means such as snap features on trim ring 922 and/or housing 905, an interference fit, additional fasteners (not shown), by being integrally formed with housing 905, or by simply being located between housing 905 and an optional second trim ring 932. When present, first trim ring 922 may include a surface 920 that can form a transition zone; that is, surface 920 may be reflective and/or diffusive so as to create a stepped or graded transition of light relative to the location of light emitters 901.

First trim ring 922 may also couple with an optional first lens 930, as shown, which may serve a variety of functions. When present, optional first lens 912 will usually provide mechanical and/or optical protection for light emitters 901 (e.g., protection from weather, insects, dust and the like). In some embodiments, first lens 930 diffuses light from light emitters 901 so as to provide a uniform illuminated area, or spatially distinct illuminated areas, within first trim ring 922. That is, first lens 930 may be transparent, translucent and/or diffusive in different portions, so as to create transition zones. For example, a central portion of first lens 930 may be transparent so as to maximize light throughput from light emitters 901 in a central, luminous zone, and one or more peripheral portions of first lens 930 may be diffusive so as to create an outer transition zone, as discussed below in connection with FIG. 13. First lens 930 may also act as a refractor to redirect light from light emitters 901 into preferred portions of an area illuminated by luminaire 900. When present, optional first lens 930 may couple mechanically with any of first trim ring 922, housing 905, substrate 907, and/or with other features of luminaire 900.

A further optional second trim ring 932 and/or a further optional second lens 940 may also be present in embodiments. Optional second lens 940 can provide similar benefits as first lens 930 described above, and can also serve to mix and diffuse light further when surface 920 is present, so as to alter the transition zone produced by surface 920. For example, if at least an outer region of second lens 940 is translucent or diffusive, the transition zone produced by surface 920 may remain present in terms of luminous intensity, while obscuring physical features of surface 920 from direct view.

Figure 11:
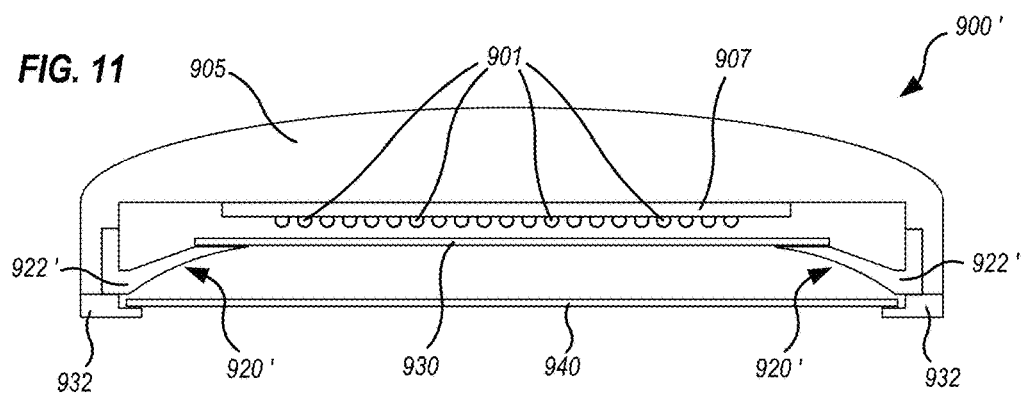
FIG. 11 schematically illustrates concave surfaces forming a transition zone, in accord with embodiments.
Figure 12:
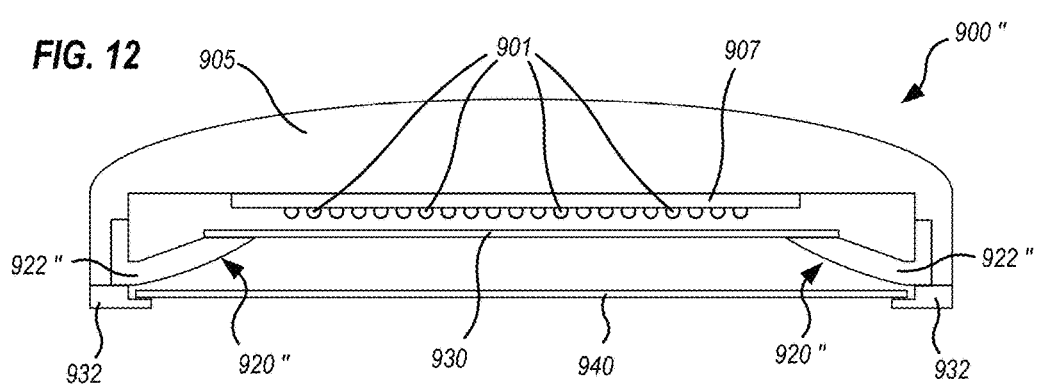
FIG. 12 schematically illustrates convex surfaces forming a transition zone, in accord with embodiments.

FIGS. 11 and 12 schematically illustrate concave and convex surfaces forming transition zones. FIG. 11 illustrates a luminaire 900' with features that are equivalent to those in luminaire 900 (FIG. 10), except that first trim ring 922' includes concave surfaces 920'. FIG. 12 illustrates a luminaire 900' in which all features are equivalent to those in luminaire 900, except that first trim ring 922" includes convex surfaces 920".

Figure 19:
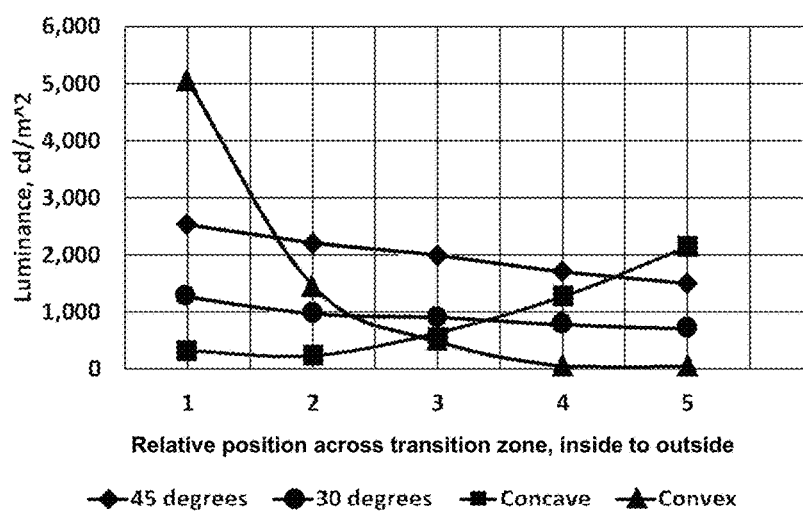
FIG. 19 is a graph illustrating relative performance of reflective transition zones with flat profiles at different angles, and concave and convex profiles, in accord with embodiments.

One skilled in the art will recognize that the relative concave, flat or convex surfaces provided will reflect and/or diffuse light differently, providing appropriate transition zones for different applications. FIG. 19 is a graph illustrating relative performance of reflective transition zones with flat profiles at different angles, and concave and convex profiles, in luminaires similar to luminaires 900, 900' and 900", FIGS. 10-12. The transition zones illustrated by the data of FIG. 19 are passive (e.g., diffusely reflective) instead of being provided by separate light sources. The horizontal axis corresponds to position across each transition zone, from inside to outside, while the vertical axis corresponds to luminance measured at each such position. Reflective profiles that are flat (e.g., like surface 920, FIG. 10) with 30 and 45 degree slopes relative to an inner luminous zone provide luminance that decreases roughly linearly with distance from the luminous zone. A reflective profile that is concave (e.g., like surface 920', FIG. 11) provides luminance that initially decreases with distance from the luminous zone, and later increases. It will be appreciated that this is due to light reflecting more strongly from the reflective surface when it impinges on the surface at steeper angles that are present around the periphery of the surface, as compared to the center. In contrast with this, a reflective profile that is convex (e.g., like surface 920", FIG. 12) provides very high luminance nearest the luminous zone that decreases with distance from the luminous zone to near zero luminance. This is due, again, to light reflecting more strongly from the reflective surface when it impinges on the surface at steeper angles, but in this case the steeper angles are closest to the luminous zone. In fact, a convex profile can lead to the condition that outer portions of the profile do not have a direct line of sight to the luminous zone, leading to zero luminance in such portions. The data of FIG. 19 are also particular to an arrangement in which a planar light emission surface is surrounded by reflectors that extend outwardly from the light emission surface. Different results will occur when the light emission surface is not planar; an example is provided in connection with FIGS. 18A and 18B.

Figure 13:
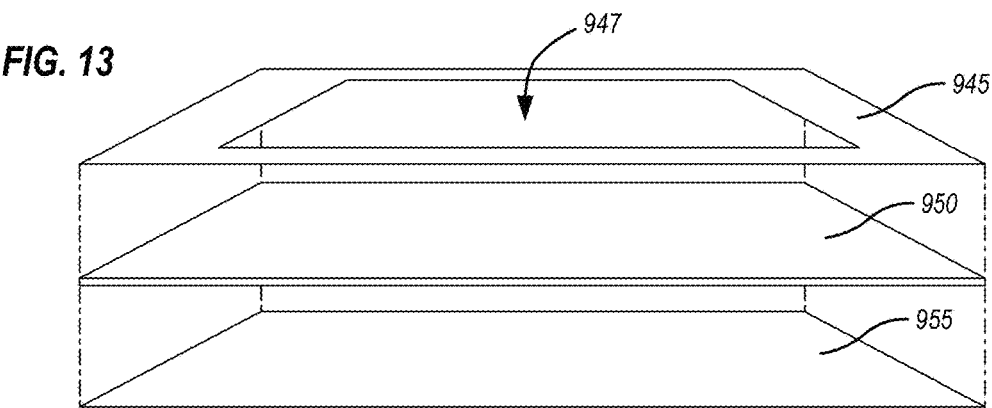
FIG. 13 schematically illustrates, in an exploded view, a lens with coatings applied thereto, to create transition zones or other optical effects, in accord with embodiments.

FIG. 13 schematically illustrates, in an exploded view, a lens 950 with coatings 945, 955 applied thereto, to create transition zones or other optical effects. Lens 950 may be an example of any of lenses 230, 330, 930, or 940 discussed above. Coatings 945, 955 may be solids, films or gels, with or without light scattering, diffusing or wavelength-shifting materials (e.g., bubbles, powders, phosphors) admixed therein, and may also include surface features for diffusive or refractive effects, as illustrated below in connection with FIGS. 14A and 14B. Coatings 945, 955 may be complete and unbroken layers coating an entirety of a surface of lens 950 (e.g., as shown for coating 955) or one or more apertures may be formed therein (e.g., aperture 947 shown through coating 945). Coatings with apertures formed therein may be utilized to form transition zones about luminous zones, where the transition zone corresponds with the area of the coating and the luminous zone corresponds to the area of the aperture. One or more coatings without apertures may be useful for diffusing light in fixtures where other features (e.g., reflectors, arrangements of different light emitters, selectively dimmed light emitters, etc. as discussed above) create luminous intensity changes, and the coatings further soften transitions therebetween.

Figure 14A:
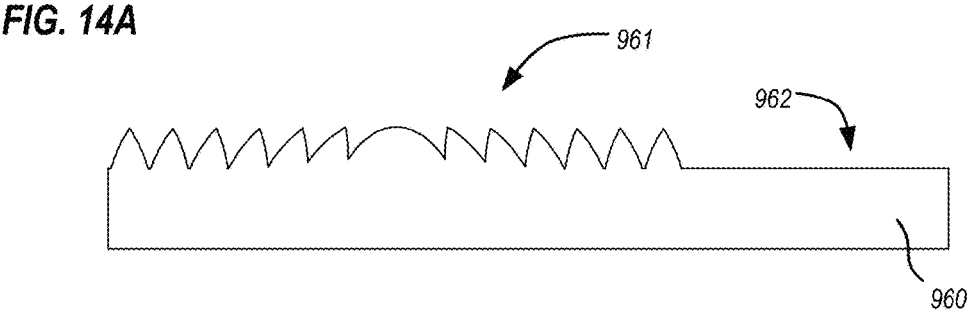
FIG. 14A schematically illustrates a Fresnel lens surface portion on a first area of an optical material, in accord with embodiments.
Figure 14B:
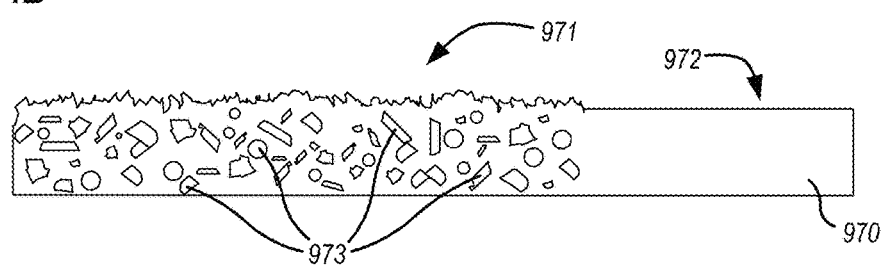
FIG. 14B illustrates a diffusive surface and light scattering materials within an optical material, in accord with embodiments.

FIGS. 14A and 14B schematically illustrate surface and bulk material techniques that may be utilized with any of the lenses herein to provide refraction, scattering and/or wavelength shifting for light passing through. FIG. 14A schematically illustrates a Fresnel lens surface portion 961 on a first area of an optical material 960. Fresnel lens surface portion 961 may be formed directly on a lens, or may be formed on a coating that is applied to a lens. Fresnel lens surface portion 961 allows an otherwise relatively flat lens to act as a refractive surface to direct light passing therethrough toward a desired angle. FIG. 14A also illustrates a planar surface portion 962 adjacent to surface portion 961; thus, it is appreciated that surface portion 961 may cover all of, or only part of, a lens. FIG. 14B illustrates a diffusive or frosted surface 971 and light scattering materials 973 within an optical material 970. Diffusive surface 971 includes random or semi-random surface variations that scatter light, so that at least some of light passing through optical material 970 becomes randomized in direction. This tends to blend and blur regions of light discernible on surface 971. Light scattering materials 973 may be powders, bubbles, and/or materials of different refractive indices than optical material 970, and may be transparent, translucent, or opaquely reflective so that at least some light is scattered upon impinging on such materials. Light scattering materials 973 may also be phosphors that will absorb and re-emit a portion of incident light at longer wavelengths. FIG. 14B also illustrates a planar surface portion 972 adjacent to a portion of optical material 970 without light scattering materials 973; thus, it is appreciated that diffusive surface 971 and light scattering materials 973 may cover all of, or only part of, a lens. One skilled in the art will readily understand how to select appropriate areas of lenses, and how to provide surface angles and curvatures of Fresnel lens surface portion 961, surface feature size and type of diffusive surface 971, and material type, size distribution and density of light scattering materials 973, for desired optical performance.

In some embodiments, privacy glass technology may be used to create one or more transition zones. The privacy glass may be provided on a lens (e.g., either first lens 930 or second lens 940, FIGS. 10-12) at a desired transition zone location and in a desired transition zone shape. The glass can be controlled to change from translucent to transparent. When translucent, the privacy glass acts as a diffuser (similar to the diffusing film discussed in connection with FIG. 13) that creates one or more transition zones.

In some embodiments, a waveguide is used to capture light emitted from the light emitters and to propagate the light internally, via total internal reflection, until it exits the waveguide. In such embodiments, the light emitters are positioned along the edges of the waveguide so as to emit light into the waveguide. The compact size of LEDs makes them particularly useful for light emitters in these embodiments, but other light emitters can be used. The waveguide may include scattering material and/or surface texturing to force the light out of total internal reflection so that it exits the waveguide. Such scattering material and/or texturing can be selectively provided in areas of the waveguide where light emission is desired, can be omitted in areas of the waveguide where light emission should not occur, and can be adjusted in character and density to provide more or less light emission from some areas than from others.

Waveguides are particularly well-suited for this application, as light from the light emitters can be selectively extracted from appropriate areas of the waveguide to provide a tailored light emission pattern. For example, an extraction pattern can provide relatively even distribution of light emission in one area for a luminous zone that appears uniformly lit. If desired, light from the light emitters can be selectively extracted from other areas of the waveguide to provide transition zones; scattering materials or surface treatments can be applied selectively so that less light is extracted in the transition zone(s) as compared to the luminous zone. As discussed below, reflectors can be used to form additional transition zones surrounding the luminous zone, and further optional lenses can be provided to smooth light intensity transitions from the luminous zone to the transition zones, and any light intensity gradients that may exist within the transition zones.

FIG. 15A illustrates, in an exploded view, some elements of a luminaire 1000 with transition zones for glare control, that uses a waveguide 1003 to capture light from light emitters 1001. Light emitters 1001 may be LEDs mounted on PCBs 1002. FIG. 15B is a cross-sectional detail of certain ones of the PCBs 1002 and light emitters 1001, and the waveguide 1003, taken through section 15B-15B indicated in FIG. 15A. A housing 1005 provides structural support to waveguide 1003, PCBs 1002 and the other elements noted in FIG. 15A. PCBs 1002 are disposed relative to waveguide 1003 so that light from the LEDs is captured through edges of waveguide 1003 and propagates throughout waveguide 1003 by internal reflection. The internal reflection may be total internal reflection caused by a refractive index difference between material of waveguide 1003 and surrounding materials (or air), or the internal reflection may be aided by internally reflective coatings on portions of waveguide 1003. Frontside and backside regions of waveguide 1003 provide light extraction features to selectively extract light that is then emitted from a front surface of waveguide 1003, to form a luminous zone 1010 and a transition zone 1025. That is, differing light extraction features associated with waveguide 1003 define the luminous zone and the transition zone 1025 of luminaire 1000. Examples of light extraction features and internally reflective coatings are illustrated and discussed in connection with FIGS. 15B, 16A and 16B. A bottom frame 1015 couples with housing 1005 so as to enclose PCBs 1002 and waveguide 1003 except at an aperture 1016 that luminous zone 1010 emits light through. Surfaces 1018 of bottom frame 1015 can be formed with light colored or reflective surfaces to form transition zones about luminous zone 1010. Alternatively, an optional insert 1022 can couple with bottom frame 1015, for example to provide high reflectivity surfaces 1020 that may be of a relatively costly material (e.g., Alanod Miro® or Miro-Silver®) instead of fabricating bottom frame 1015 entirely out of the costly material. Although not shown in FIG. 15A, a further, optional outer lens (e.g., lens 940, FIG. 10) can also be provided, for increased protection and/or for increased diffusion of luminous boundaries between luminous zone 1010, transition zone 1025 and the further transition zones provided by surfaces 1018 or 1020.

FIG. 15B is a cross-sectional detail illustrating certain light emitters 1001 and PCBs 1002, and waveguide 1003, of FIG. 15A. FIG. 15B illustrates how light from light emitters 1001 can be captured into waveguide 1003, and selectively propagates through, or is extracted from, waveguide 1003 to form luminous zone 1010 and transition zone 1025. FIG. 15B is not drawn to scale; vertical dimensions are exaggerated and horizontal dimensions are minimized for illustrative clarity.

Waveguide 1003 is mounted close to light emitters 1001 such that a majority of light emitted from light emitters 1001 enters an edge of waveguide 1003, as shown. Waveguide 1003 forms a smooth outer surface except at light extraction features 1009 on an upper surface thereof. Where light from light emitters 1001 impinges on the smooth outer surface at a shallow angle, it reflects through total internal reflection. However, light extraction features 1009 present a rough, faceted or diffuse surface that scatters light from light emitters 1001 into much steeper angles (e.g., like surface 971, FIG. 14B). When the steeply angled light encounters a bottom surface of waveguide 1003, it does not internally reflect but is instead emitted. Thus, a distribution of light extraction features on the upper side of waveguide 1003 contributes to light scattering through the lower side of waveguide 1003. Also illustrated in FIG. 15B are light scattering materials 1073, which, similarly to light extraction features 1009, disrupt light traveling through waveguide 1003 and scatter at least a portion of the light into steep angles such that it emits through the bottom surface of waveguide 1003.

Light extraction features 1009 and/or light scattering materials 1073 are arranged so as to scatter a large amount of light 1011, corresponding with luminous zone 1010, and much lesser amounts of light 1026, corresponding with transition zone(s) 1025. One skilled in the art will readily conceive many extensions, equivalent and intermediate structures to form luminous zones and transition zones. By way of non-limiting example, these may include light extraction features and/or internally reflective structures of various types and light scattering abilities, and in various areas, and/or light scattering materials of various types and light scattering abilities, and in various locations within the volume of a waveguide 1003. Such features may be mixed without limitation, in both type and degree, on either side of a waveguide 1003, to tailor the light emission performance of any area of the waveguide. Certain ones of these structures are discussed below in connection with FIGS. 16A and 16B.

Figure 16A:
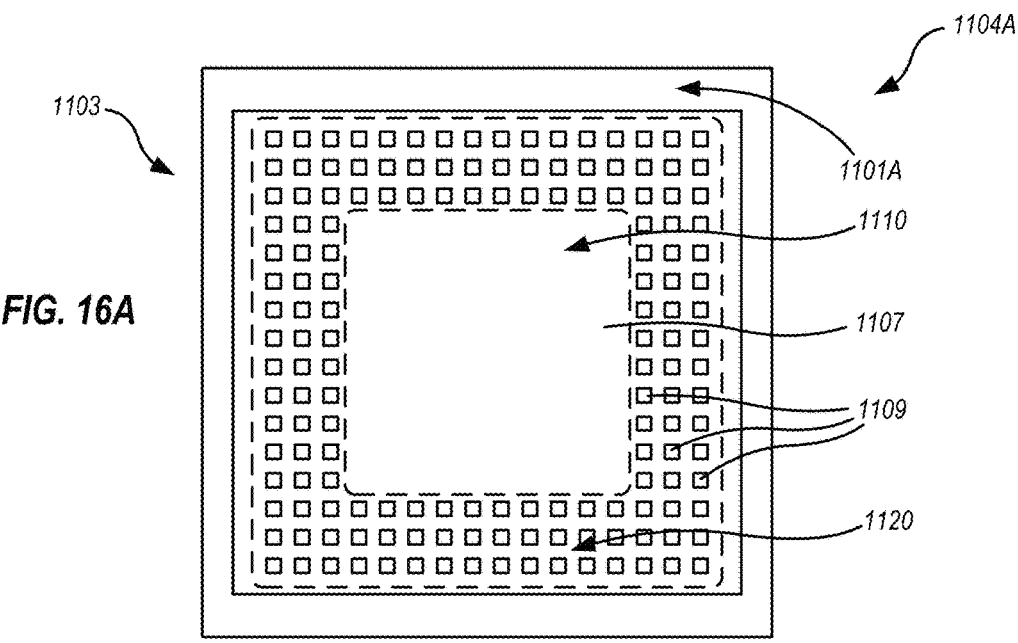
FIG. 16A schematically illustrates features of a backside surface of a waveguide for a luminaire with transition zones for glare control, in accord with an embodiment.
Figure 16B:
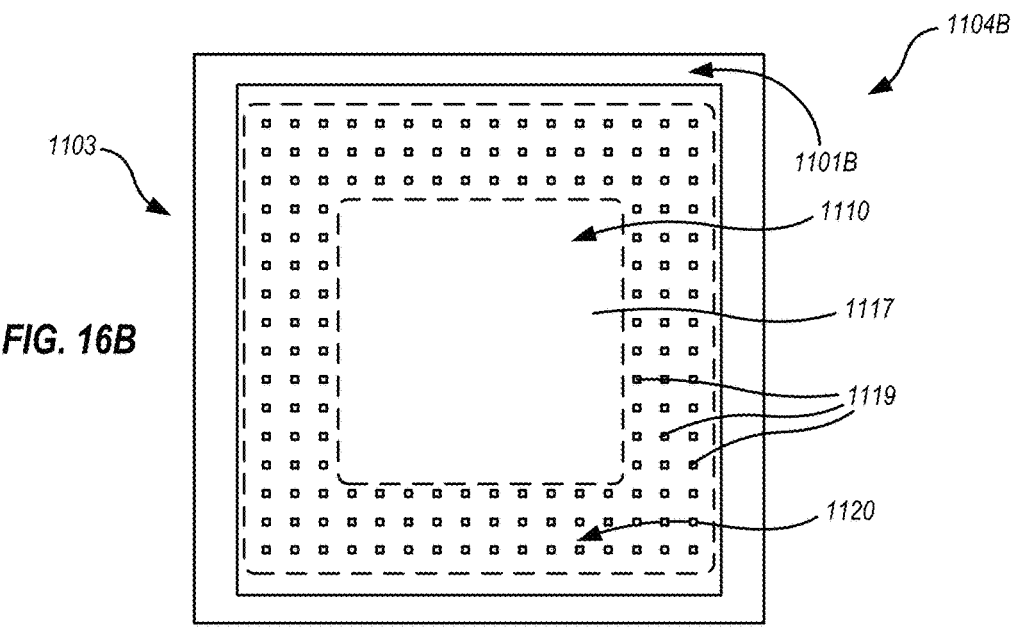
FIG. 16B schematically illustrates features of a frontside surface of a waveguide for a luminaire with transition zones for glare control, in accord with an embodiment.

FIGS. 16A and 16B schematically and respectively illustrate features of a backside surface 1104A and a frontside surface 1104B, of a waveguide 1103 for a luminaire with transition zones for glare control. The features explained and illustrated in FIGS. 16A and 16B are exemplary only, may not be present in all embodiments, and it should be understood that the features and techniques explained are adaptable in many ways by one skilled in the art.

FIG. 16A represents a backside of waveguide 1103, that is, a surface that is usually hidden from view and is opposite to a surface that emits light (which surface is shown in FIG. 16B). Elements such as a housing, a frame, or optional gaskets between such elements and waveguide 1103 may mechanically couple with waveguide 1103 at outer perimeter 1101A. Light from the light emitters will enter the edges of waveguide 1103; thus it may be advantageous for outer perimeter 1101A to be coated with an internally reflective material, such as metal. It may also be advantageous for outer perimeter 1101A to be mechanically compatible with housing elements, gaskets, sealants and the like. One skilled in the art will readily conceive ways to optimize a finish of outer perimeter 1101A to meet these objectives.

In FIG. 16A, within outer perimeter 1101A, a transition zone 1120 and a luminous zone 1110 are set off by broken lines; shapes and sizes of luminous zone 1110 and transition zone 1120 are adjustable in accordance with objectives for a given luminaire, as discussed above. It is noted that implementation of a transition zone 1120 using waveguide techniques is entirely optional. That is, transition zones may be set up through external means by reflectors and the like, such that all of waveguide 1103 forms only luminous zone 1110. Furthermore, the waveguide techniques now discussed can be applied to provide any number or manner (e.g., stepped intensity vs. graded intensity) of transition zones. The discussion that follows explains techniques that may be used, and does not mean that such techniques are required in all embodiments.

Backside surface 1104A can provide appropriate light scattering for luminous zone 1110 and transition zone 1120 through choices of finishes in these areas. For example, a diffusive or frosted surface (e.g., like surface 971, FIG. 14B) can cause light propagating through waveguide 1103 to scatter, including outwardly through frontside surface 1104B, to allow light from the light emitters to exit the waveguide. Thus, a first surface treatment 1107 in some areas of backside surface 1104A may be a diffusive surface. A second surface treatment 1109 may encourage light to remain within waveguide 1103. Second surface treatment 1109 may be simply a smooth surface to cause total internal reflection, or may be an internally reflective finish (e.g., metal). Second surface treatment 1109 may be arranged spatially in small shapes such as illustrated, or in other forms such as stripes or bands, to provide a net partial reflectivity of surface 1104A within transition zone 1120. Luminous zone 1110 will typically not include second surface treatment 1109, resulting in light that exits frontside surface 1104B being of higher average intensity within luminous zone 1110 than in transition zone 1120. One skilled in the art will readily conceive ways to arrange patterning of first and second surface treatments 1107 and 1109 respectively, to provide a luminous zone 1110 and a transition zone 1120 of any desired shape, size or luminous output.

FIG. 16B represents a frontside surface of waveguide 1103, that is, a side of waveguide 1103 that emits light. Similarly to outer perimeter 1101A, elements such as a housing, a frame, or optional gaskets between such elements and waveguide 1103 may mechanically couple with waveguide 1103 at outer perimeter 1101B, and as noted above, light from the light emitters will enter the edges of waveguide 1103. Thus, like outer perimeter 1101A, it may be advantageous for outer perimeter 1101B to be coated with an internally reflective material, and to be mechanically compatible with housing elements, gaskets, sealants and the like. Also, an extent of outer perimeter 1101B within waveguide 1103 need not be identical to the extent of outer perimeter 1101A. One skilled in the art will readily conceive ways to optimize a finish of outer perimeter 1101B to meet these objectives.

Frontside surface 1104B can also provide or modify light emission for luminous zone 1110 and transition zone 1120 through choices of finishes in these areas. For example, a smooth, first surface treatment 1117 can cause light scattered from backside surface 1104A to exit the waveguide. The finish(es) present on backside surface 1104A may be sufficient to provide a luminous zone and any transition zone(s) desires, or additional surface treatments may be provided on frontside surface 1104B. For example, a second surface treatment 1119 applied to parts of transition zone 1120 may be an internally reflective surface that encourages light to remain within waveguide 1103. Second surface treatment 1119 may be arranged spatially in small shapes such as illustrated, or in other forms such as stripes or bands, to provide a net partial reflectivity of surface 1104A within transition zone 1120. Luminous zone 1110 will typically not include second surface treatment 1119, so that light that exits frontside surface 1104B is of higher average intensity within luminous zone 1110 than in transition zone 1120. It is not required that frontside and backside surface treatments be the same in type or distribution, or that if one side has a surface treatment, that the other also be treated. One skilled in the art will readily conceive ways to arrange patterning of first and second surface treatments 1117 and/or 1119 respectively, and optionally to provide further surface treatments, to provide a luminous zone 1110 and one or more transition zones 1120 of any desired shape, size or luminous output.

In some embodiments, a luminous zone and one or more transition zones can be adjusted at least partly based on one or more predefined scenarios, including schedules. For example, a luminaire can include a real time clock, and can operate a first subset of light emitters at a set of drive conditions that provide full intensity during a certain time of day (e.g., from 7 am to 6 pm). Then, the luminaire can adjust an identification of light emitters as being in a second subset, and can provide a second set of drive conditions that reduce light intensity to the second subset of light emitters, to provide a transition zone, during another time of day (e.g., from 6 pm to 7 am). Any of the number, the type, the size, or the relative luminous intensity of transition zones may change. These changes may be repeated daily, or the changes may be altered according to a day of the week, month of the year, or other time interval. Thus, the luminaire operates on a time-based schedule, which may be independent of its environment.

In these and other embodiments, a luminaire can create, eliminate, and/or alter transition zones at least partly in response to environmental stimuli (e.g., daylight, spill light from other buildings or areas, clouds or other shadows, rain, etc.) detected by sensors. Examples of sensors that may sense such stimuli include photosensors, photocells, daylight sensors, rain sensors, and the like. Characteristics such as actual or desired area ratios, brightness ratios between the reduced luminous zone and transition zone(s), stepped vs. graded intensity transition zone characteristics, and the like (i.e., how large and bright the transition zone(s) are, relative to the (possibly reduced) luminous zone, and/or to any other transition zone(s)) can be calculated based on input from such sensors, and can be used to implement or modify the luminous zone and/or the transition zone(s).

Figure 17:
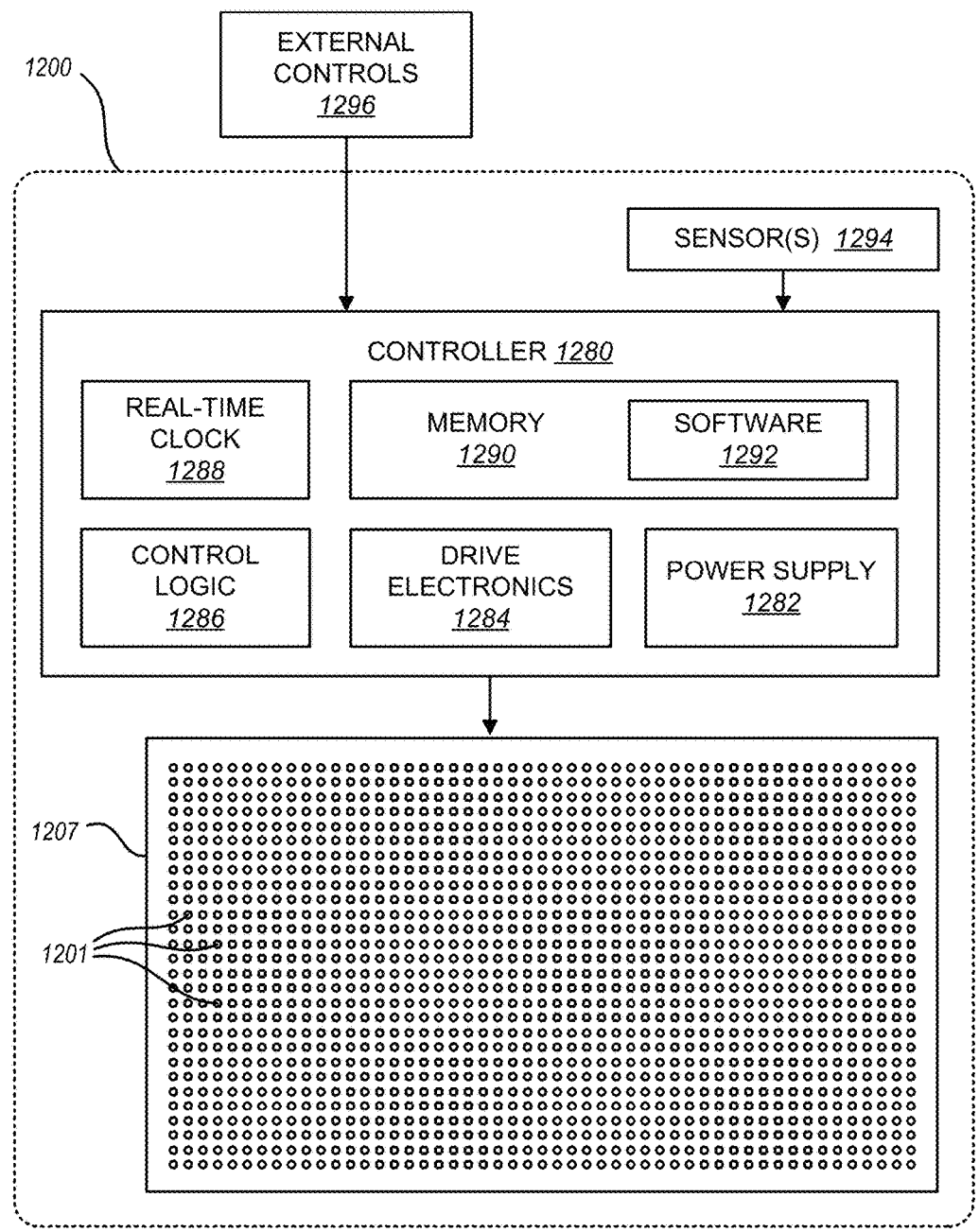
FIG. 17 schematically illustrates electronic architecture of a luminaire with transition zones for glare control, in accord with embodiments.

FIG. 17 schematically illustrates one non-limiting electronic architecture embodiment of a luminaire 1200 with transition zones for glare control. The elements illustrated in luminaire 1200 are exemplary; in embodiments, fewer than all of the elements illustrated may be present, and elements may be combined, physically distributed among locations within a luminaire or system of luminaires, and/or duplicated as appropriate. Upon reading and understanding the disclosure herein, one skilled in the art will readily recognize many variations, rearrangements, modifications and equivalents, which may appear different and function according to the elements actually present, as compared to the exemplary embodiment illustrated in luminaire 1200.

Luminaire 1200 includes a controller 1280 that supplies power to light emitters 1201. Light emitters 1201 are typically (but not necessarily) LEDs that couple with a substrate 1207. As discussed above, the type(s) and physical layout of light emitters 1201 may vary without limitation—light emitters 1201 may be LEDs of any individual color, mix of colors, variable color or tunable white; may be fluorescent, incandescent or HID sources or combinations thereof; the layout may be planar, curved, tilted, spread over multiple substrates 1207, and the like. Controller 1280 is represented in FIG. 17 as including a variety of elements, but embodiments herein are not limited to having all such components within a single element designated as the controller; the elements may be distributed in multiple places and/or integrated differently than shown, as will be appreciated by one skilled in the art. Connections among the elements within controller 1280 are not shown for clarity of illustration.

Controller 1280 includes a power supply 1282 that converts external power (e.g., 120 VAC mains power) into low and/or direct current (DC) power as needed to drive light emitters 1201. The power thus generated may be provided to drive electronics 1284, which uses one or more drive circuits to supply appropriate drive conditions to light emitters 1201. Multiple drive circuits within drive electronics 1284 may be configured to drive corresponding, multiple subsets of light emitters 1201. For example, when a first subset of the light emitters forms a luminous zone and a second subset of the light emitters forms one or more transition zones, the first and second subsets of the light emitters may be powered by different ones of the drive circuits. Drive electronics 1284 may also be used to provide appropriate power and adjustments thereto for control of transition zones implemented using privacy glass, as discussed above. Control logic 1286 controls drive electronics 1284 to implement changes in power conditions to light emitters 1201, individually or in groups, to implement changes in luminous and/or transition zones. Control logic 1286 may, for example, provide a set of power conditions to light emitters 1201 according to a state of a real-time clock 1288. Alternatively, control logic 1286 may utilize input from one or more sensors 1294, and/or external controls 1296, to determine the power conditions to provide. In doing so, control logic 1286 may communicate with memory 1290, either to store or retrieve information relevant to determining appropriate power conditions, or to access and/or execute software 1292 stored therein. Sensors 1294 may be located so as to sense only external illumination conditions (e.g., without sensing light from luminaire 1200 itself) or, alternatively, so as to sense illumination conditions within the illuminated area (e.g., including both external light, and light emitted by luminaire 1200).

Light emitters 1201 can be controlled by controller 1280 to create one or more transition zones provided in any pattern, using the modalities discussed above. Luminance can be provided from a single luminous zone that includes all light emitters 1201, or can gradually change from a reduced luminous zone through one or more transition zones (e.g., as shown in FIGS. 2 through 9C). In embodiments, luminaire 1200 can generate a pre-defined luminance distribution based on customer preferences, the intended application (a parking lot, a park, etc.), or environmental stimuli. The luminous zone and/or transition zone(s) may have different luminance distributions, shapes (e.g., concave, convex, tilted, flat, etc.) and orientations.

In one non-limiting example of an outdoor luminaire 1200, at dusk luminaire 1200 executes software 1292 that includes instructions to turn on light emitters 1201 so as to form a single luminous zone, without any transition zones. In the early evening when there is still some daylight, the contrast between the luminous zone and the sky will not be that stark, and thus a transition zone(s) might not be necessary for glare reduction simply because the conditions are not that harsh (e.g., when presence of background or ambient light minimizes a brightness difference between the luminous zone and its surroundings). Thus, in such situations transition zone(s) may not be needed—rather, brightness and size of just the luminous zone can be controlled and changed based on the input from an environmental sensor (e.g., a sensor 1294, perhaps a photocell). Thus, at that time (as determined by real-time clock 1288) controller 1280 may control light emitters 1201 so that the luminous zone emits light of a relatively low luminous intensity (i.e., it is not necessary for luminaire 1200 to emit light of the same intensity as needed in the dark of night, for example). This can be accomplished, for example, by controller 1280 controlling drive electronics 1284 to provide lower drive conditions to some or all of light emitters 1201 so that they emit light of a lower luminous intensity, to provide a transition zone. Alternatively or in addition, controller 1280 can control drive electronics 1284 to only drive some, but not all, of light emitters 1201. Still alternatively or in addition, controller 1280 can control drive electronics 1284 to provide drive conditions for some of light emitters 1201 to cause them to emit light of a differing chromaticity, such as a "warm white" (e.g., a low color temperature such as 2500K to 3500K) transition zone, surrounding a "cool white" (e.g., a higher color temperature such as 4000K to 6000K) luminous zone.

As it gets darker, controller 1280 can control light emitters 1201 within an inner part of a luminous zone to become brighter, to deliver sufficient light for the application, while light emitters 1201 located in an outer part of the luminous zone may stay constant, and/or may dim, change in chromaticity, or may be completely turned off, so as to create at least one transition zone (with some light emitters 1201 remaining on, if others are de-activated). Brightness as well as area of the reduced luminous zone and transition zone(s) can continually adjust to maintain the optimal brightness and area ratio given the sensed environmental conditions. At dawn, the reduced luminous zone and transition zone(s) can merge back into the original luminous zone, which, depending on the daylight conditions, can emit light of a lower brightness or no light at all.

The luminous intensity of the light within the luminous zone (both in the static and dynamic embodiments) may change and need not, but may, stay constant. However, the light emitted from the luminous zone will typically have greater luminance than the light emitted from the transition zone(s) so that the transition zone(s) can serve their glare reduction purpose.

Figure 18A:
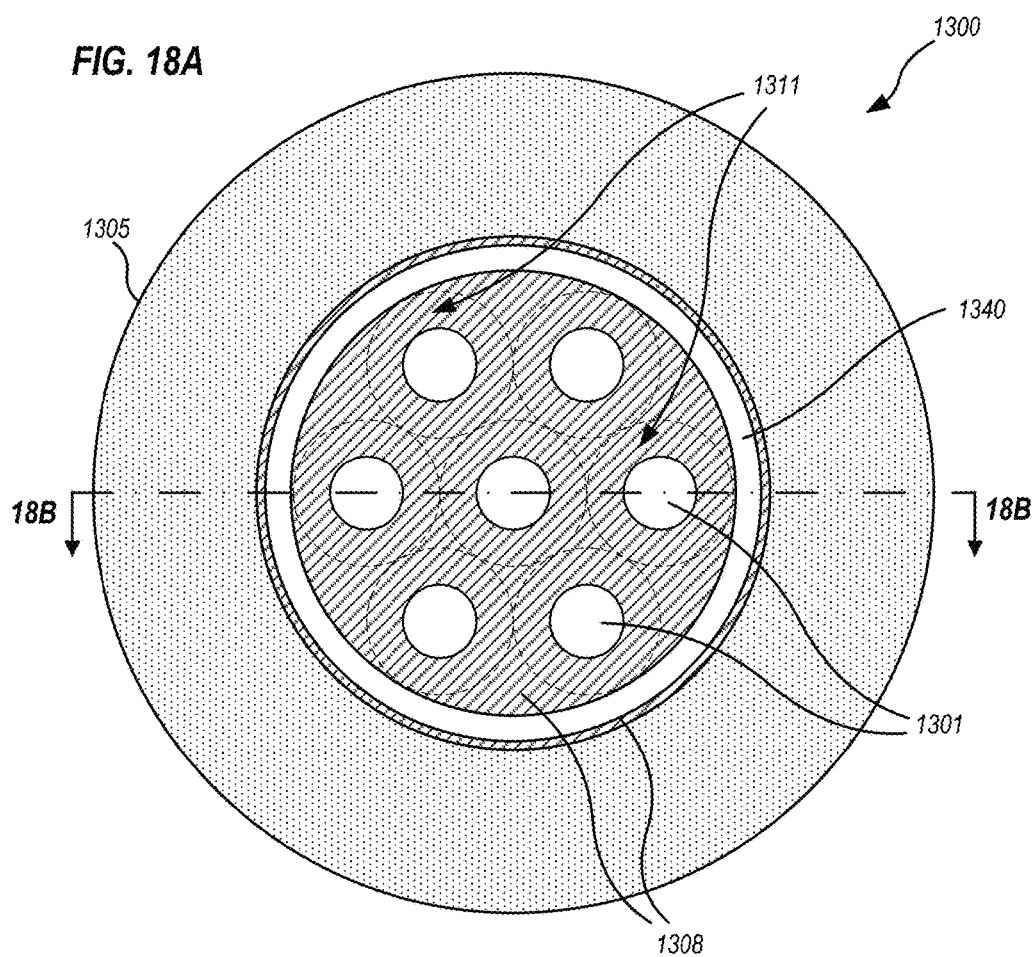
FIG. 18A is a plan view that schematically illustrates a luminaire with a transition zone for glare control, in accord with embodiments.
Figure 18B:
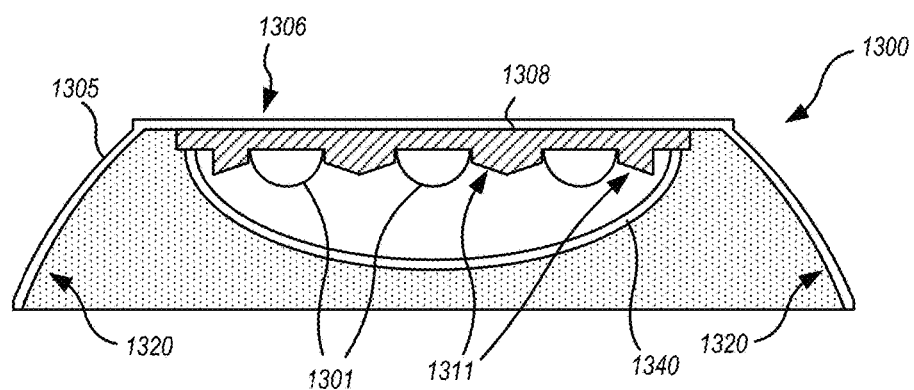
FIG. 18B is a schematic cross-sectional view of the luminaire of FIG. 18A.

FIGS. 18A and 18B schematically illustrate a luminaire 1300 with a transition zone for glare control. FIG. 18A is an upward looking, bottom plan view; FIG. 18B is a cross-sectional view taken along sight line 18B-18B in FIG. 18A. Luminaire 1300 includes a housing 1305 that includes a light-diffusing surface 1320 that is coupled with and extends downwardly from a top plate portion 1306. Light-diffusing surface 1320 couples with top plate portion 1306 such that housing 1305 forms a downward-facing cavity about a lens 1340. Enclosed between lens 1340 and top plate portion 1306, light emitters 1301 couple with an underside of top plate portion 1306. Optionally, light emitters 1301 are disposed within recesses 1311 of a light engine plate 1308 (lens 1340 is treated as transparent in FIGS. 18A and 18B). Light emitters 1301 may be individual light emitters such as unpackaged or packaged LED chips, or may be integrated light engines sometimes referred to as chip-on-board (COB) sources. Light emitters 1301 may have individual optics to spread light therefrom; in particular optics of light emitters 1301 may be optimized to minimize light projecting at a normal angle from top plate portion 1306, and instead, to focus light outwardly from each light emitter so as to spread the light over a larger illuminated area. Light engine plate 1308 may have a diffuse surface (e.g., white molded plastic, or a white paint surface) so as to locally blend some of the light from light emitters 1301. Lens 1340 may be clear, may incorporate further optics for broadening an emission pattern of the light, and/or may have a diffuse surface to scatter light incident thereon. In embodiments such scattering may occur with only minor loss of directionality, so that the overall directionality of the light is preserved, but direct views of individual ones of light emitters 1301 are obscured. Thus, an entire surface of lens 1340 forms a luminous zone. Light-diffusing surface 1320 forms a transition zone for luminaire 1300, so that from the vantage point of a viewer, contrast of the luminous zone formed by lens 1340 against a dark background is minimized. Furthermore, because lens 1340 extends away from top plate portion 1306 into the downward-facing cavity formed by light-diffusing surface 1320, light from lens 1340 projects evenly into all portions of light-diffusing surface 1320. This minimizes or eliminates the decrease in brightness that can occur when a planar luminous zone is disposed adjacent to a concave transition zone surface, as discussed above in connection with FIGS. 12 and 19.

Figure 20:
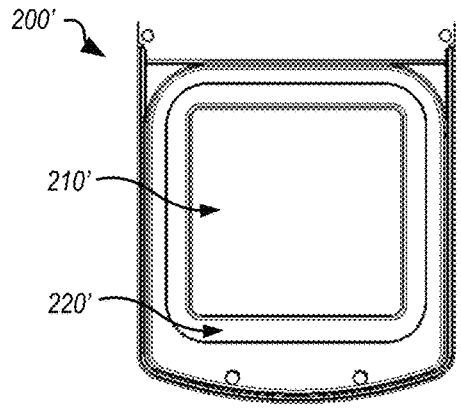
FIG. 20 schematically illustrates a luminaire with a luminous zone and a transition zone, wherein a ratio of the area of the transition zone to the area of the luminous zone is under 0.5:1, in accord with an embodiment.
Figure 21:
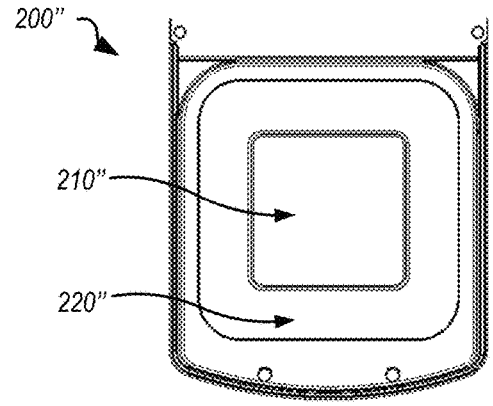
FIG. 21 schematically illustrates a luminaire with a luminous zone and a transition zone, wherein a ratio of the area of the transition zone to the area of the luminous zone is about 2:1, in accord with an embodiment.
Figure 22:
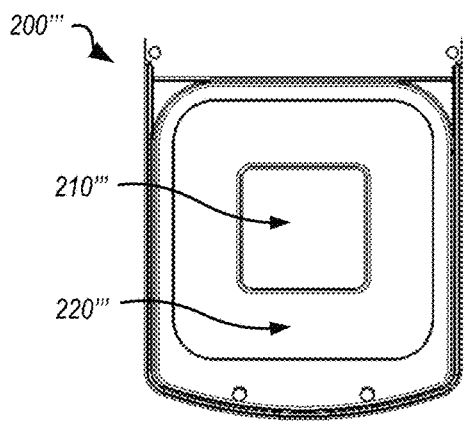
FIG. 22 schematically illustrates a luminaire with a luminous zone and a transition zone, wherein a ratio of the area of the transition zone to the area of the luminous zone is about 3:1, in accord with an embodiment.
Figure 23:
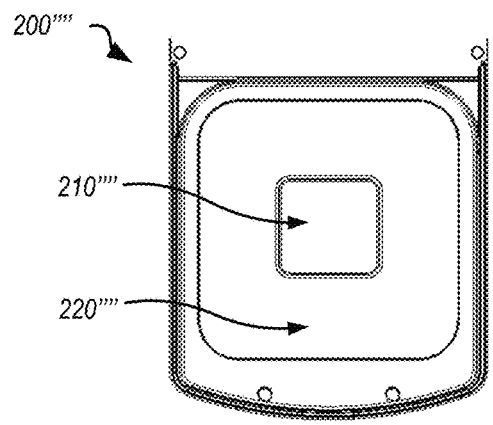
FIG. 23 schematically illustrates a luminaire with a luminous zone and a transition zone, wherein a ratio of the area of the transition zone to the area of the luminous zone is about 5:1, in accord with an embodiment.
Figure 24:
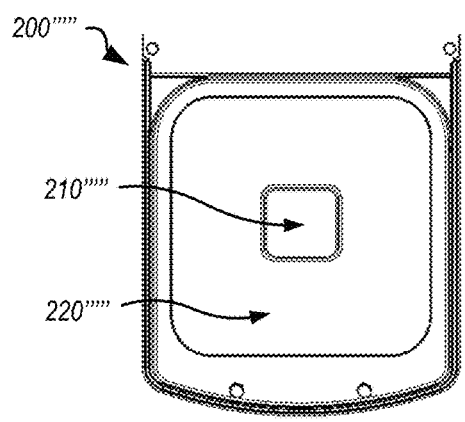
FIG. 24 schematically illustrates a luminaire with a luminous zone and a transition zone, wherein a ratio of the area of the transition zone to the area of the luminous zone is about 10:1, in accord with an embodiment.

Suitability for a given application can depend on the relative perceived sizes of luminous and transition zones. For example, in certain applications a small transition zone may be appropriate, especially when light from the transition zone is of a different chromaticity than light from the luminous zone, to give just a bit of a softer appearance. In other applications a much larger transition zone may be helpful to reduce the human perception of glare and/or for decorative effect. FIGS. 20 through 23 schematically illustrate luminaires with differing ratios of luminous zone area to transition zone area. Referring briefly back to luminaire 200, FIG. 3, transition zone 220 can be characterized as having a transition zone area, and luminous zone 210 can be characterized as having a luminous zone area. in FIG. 3, a ratio of the transition zone area to the luminous zone area is about 0.65:1. Similarly, FIG. 20 schematically illustrates a luminaire 200' with a larger luminous zone 210' and a smaller transition zone 220'. A ratio of the transition zone area to the luminous zone area is under 0.5:1 for luminaire 200'. FIG. 21 schematically illustrates a luminaire 200" with a smaller luminous zone 210" and a larger transition zone 220". A ratio of the transition zone area to the luminous zone area is about 2:1 for luminaire 200". FIG. 22 schematically illustrates a luminaire 200''' with a still smaller luminous zone 210''' and a still larger transition zone 220'''. A ratio of the transition zone area to the luminous zone area is about 3:1 for luminaire 200'''. FIG. 23 schematically illustrates a luminaire 200'''' with a still smaller luminous zone 210'''' and a still larger transition zone 220''''. A ratio of the transition zone area to the luminous zone area is about 5:1 for luminaire 200''''. FIG. 24 schematically illustrates a luminaire 200''''' with a still smaller luminous zone 210' and a still larger transition zone 220'''''. A ratio of the transition zone area to the luminous zone area is about 10:1 for luminaire 200'''''. These area ratios, and larger or smaller ratios, may be advantageous for certain applications.

Figure 25A:
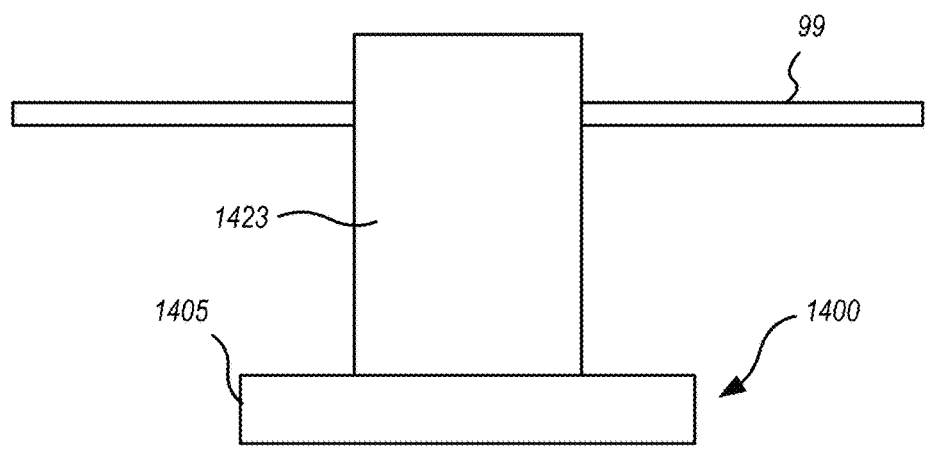
FIG. 25A schematically illustrates a luminaire that forms a transition zone about a luminous zone that is illuminated by a skylight, in accord with an embodiment.
Figure 25B:
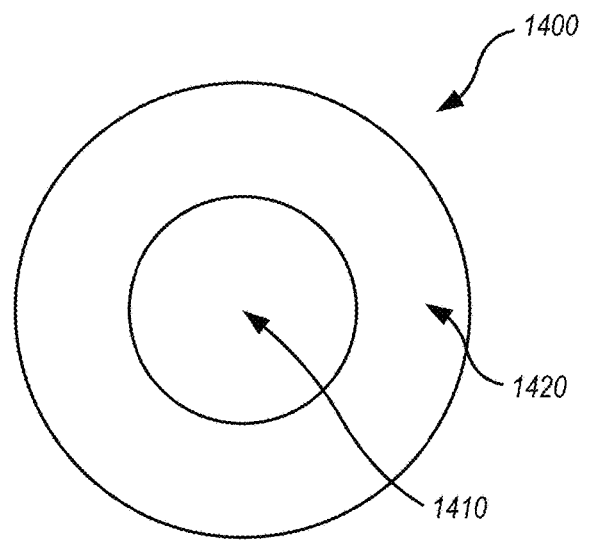
FIG. 25B is an upward looking, bottom plan view of the luminaire of FIG. 25A.

FIG. 25A schematically illustrates a luminaire 1400 that forms a transition zone 1420 about a luminous zone 1410 that is illuminated by a skylight. FIG. 25A is a schematic cross-sectional view of a skylight 1423 that is mounted with a roof or ceiling 99 so that skylight 1423 can collect sunlight during the day. A housing 1405 of luminaire 1400 couples with a lower end of skylight 1423 and provides mechanical support, and optionally, electrical connectivity, for elements therein. FIG. 25B is an upward looking, bottom plan view of luminaire 1400, and illustrates a luminous zone 1410 that is provided by sunlight from skylight 1423, and a transition zone 1420 surrounding luminous zone 1410. Upon reading and understanding the preceding disclosure, one skilled in the art will readily apply the teachings herein to conceive many modalities for implementing luminaire 1400. For example, a passive embodiment of luminaire 1400 can use optics that divert a portion of light from skylight 1423 into transition zone 1420. The fraction of light from skylight 1423 that is diverted into transition zone 1420 can range from small to large fractions of the total, and various relative areas of luminous zone 1410 and transition zone 1420 can be implemented. Alternatively, luminaire 1400 may use artificial light emitters to implement transition zone 1420, One or more first transition zones may use sunlight as a light source, while one or more second transition zones may use artificial light. Refractive optics, reflective optics, diffusers and/or filters can be used to modify light distributions emitted by both luminous zone 1410 and transition zone 1420. Skylight 1423 may pass through a roof and/or one or more ceilings, and can be disposed in orientations other than vertical. Skylight 1423 can narrow or widen to meet spatial and/or mechanical requirements. Luminous zone 1410 and transition zone(s) 1420 are not limited to the relative sizes or to the round and/or planar shapes shown in FIG. 25B.

Combinations of Features

Upon reading and comprehending the present disclosure, one skilled in the art will readily conceive many extensions, equivalent and intermediate structures to implement the modalities described herein. That is, the following examples, and others, are considered as explicitly disclosed.

Example A

A luminaire includes a housing, a luminous zone coupled with the housing, and one or more transition zones coupled with the housing and disposed adjacent to the luminous zone. The luminous zone provides a first light to an illuminated area, and the one or more transition zones provide a second light to the illuminated area. The first light is harsher than the second light.

Example B

The luminaire of Example A or any of the subsequent examples, in which the one or more transition zones surround the luminous zone, as viewed from within the illuminated area.

Example C

The luminaire of Example A or any of the preceding or subsequent examples, in which the luminous zone is characterized by a luminous zone area, the one or more transition zones are characterized by a transition zone area, and the transition zone area is less than or equal to the luminous zone area, or the transition zone area is greater than the luminous zone area, or the transition zone area is at least three times the luminous zone area, or the transition zone area is at least ten times the luminous zone area.

Example D

The luminaire of Example A or any of the preceding or subsequent examples, in which the first light being harsher than the second light includes one or more of a net light output of the luminous zone being greater than a net light output of the one or more transition zones, a luminous flux per unit area of the luminous zone being greater than a luminous flux per unit area of the one or more transition zones; and/or a chromaticity of the luminous zone being of a higher correlated color temperature than a chromaticity of the one or more transition zones.

Example E

The luminaire of Example A or any of the preceding or subsequent examples, in which the luminaire includes an arrangement of light emitters that form the luminous zone and the one or more transition zones, wherein a first subset of the light emitters forms the luminous zone and a second subset of the light emitters forms the one or more transition zones.

Example F

The luminaire of Example E or any of the preceding or subsequent examples, in which the first subset of the light emitters is of a first type, and at least some of the second subset of the light emitters are of a second type that is different from the first type.

Example G

The luminaire of Example F or any of the preceding or subsequent examples, in which the first subset of the light emitters is characterized by a first chromaticity, and the second subset of the light emitters is characterized by a second chromaticity that is different from the first chromaticity.

Example H

The luminaire of Example E or any of the preceding or subsequent examples, in which the first subset and the second subset of the light emitters are of the same type as one another, the first subset of the light emitters is powered by one or more first drive circuits, and the second subset of the light emitters is powered by one or more second drive circuits.

Example I

The luminaire of Example H or any of the preceding or subsequent examples, in which the one or more first drive circuits provide a first level of drive conditions to the first subset of the light emitters, and the one or more second drive circuits provide a second level of drive conditions to the second subset of the light emitters, the second level being in a fixed ratio with respect to the first level; or; the one or more first drive circuits provide a first level of drive conditions to the first subset of the light emitters, and the one or more second drive circuits provide a second level of drive conditions to the second subset of the light emitters, the second level being in an adjustable ratio with respect to the first level.

Example J

The luminaire of Example I or any of the preceding or subsequent examples, in which the luminaire includes a controller that adjusts the adjustable ratio based on time of day, or wherein the luminaire includes both a controller and a light sensor, and the controller adjusts the adjustable ratio based at least in part on an illumination condition sensed by the light sensor.

Example K

The luminaire of Example J or any of the preceding or subsequent examples, in which the light sensor is disposed so as to sense the illumination condition within the illuminated area, or in which the light sensor is disposed so as to sense the illumination condition outside of the illuminated area and does not sense light emitted by the luminaire.

Example L

The luminaire of Example E or any of the preceding or subsequent examples, in which the first subset and the second subset of the light emitters are of the same type as one another; and an identification of at least a portion of the light emitters as being in the first subset or the second subset is adjustable.

Example M

The luminaire of Example L or any of the preceding or subsequent examples, in which the light emitters identified as being in the first subset or the second subset are adjustable based on time of day.

Example N

The luminaire of Example L or any of the preceding or subsequent examples, in which the luminaire includes a light sensor, and wherein the light emitters identified as being in the first subset or the second subset are adjustable based at least in part on an illumination condition sensed by the light sensor.

Example O

The luminaire of Example A or any of the preceding or subsequent examples, in which the luminous zone includes one or more light emitters, and the one or more transition zones comprise one or more reflectors disposed adjacent to the one or more light emitters.

Example P

The luminaire of Example O or any of the preceding or subsequent examples, in which one or more of the reflectors includes a convex surface and/or a concave surface.

Example Q

The luminaire of Example A or any of the preceding or subsequent examples, in which the luminaire includes a lens coupled with the housing, and in which a central portion of the lens corresponds with the luminous zone, and a peripheral portion of the lens corresponds with one of the one or more transition zones.

Example R

The luminaire of Example Q or any of the preceding or subsequent examples, in which the peripheral portion of the lens comprises at least one of a diffusive surface, a phosphor and a filter to form the one or more transition zones.

Example S

The luminaire of Example A or any of the preceding or subsequent examples, in which the luminaire includes a waveguide and one or more light emitters that emit light into the waveguide, and in which a central portion of the waveguide corresponds with the luminous zone, and a peripheral portion of the waveguide corresponds with at least one of the one or more transition zones.

Example T

The luminaire of Example S or any of the preceding or subsequent examples, in which wherein differing light extraction features of the waveguide define the luminous zone and the at least one of the one or more transition zones.

Example U

The luminaire of Example A or any of the preceding or subsequent examples, in which the luminaire uses sunlight to provide the first light, and/or in which the luminaire uses sunlight to provide at least part of the second light, and/or in which the luminaire uses an artificial light emitter to provide at least part of the second light.

Example V

The luminaire of Example A or any of the preceding or subsequent examples, in which the housing comprises a top plate portion coupled with a light-diffusing surface extending downwardly from the top plate portion, so as to form a downward-facing cavity, one or more light emitters couple with an underside of the top plate portion, and a lens couples with the top plate surface such that the lens and the top plate portion enclose the one or more light emitters, such that the lens forms the luminous zone and the light-diffusing surface forms the one or more transition zones.

Example W

A method of illuminating an area includes providing a first light to the area from a luminous zone of a luminaire, and providing a second light to the area from one or more transition zones disposed adjacent to the luminous zone within the luminaire. The first light is a harsher light than the second light.

Example X

The method of Example W or any of the subsequent method examples, in which providing the second light includes providing the second light with one of a net light output that is less than a net light output of the first light, a luminous flux per unit area that is less than a luminous flux per unit area of the first light, and/or a chromaticity having a lower correlated color intensity than a chromaticity of the first light.

Example Y

The method of Example W or any of the preceding or subsequent method examples, in which providing the first light comprises providing the first light at a first intensity, providing the second light comprises providing the second light at a second intensity, at a first time of day, the first intensity is greater than the second intensity, and at a second time of day, the second intensity is substantially equal to the first intensity.

Example Z

The method of Example W or any of the preceding or subsequent method examples, in which providing the first light comprises providing the first light with a first chromaticity, and providing the second light comprises providing the second light with a second chromaticity that is different from the first chromaticity.

Example AA

The method of Example W or any of the preceding or subsequent method examples, in which providing the first light comprises providing the first light with a first chromaticity, providing the second light comprises providing the second light with a second chromaticity, at a first time of day, the second chromaticity is different from the first chromaticity, and at a second time of day, the second chromaticity is substantially the same as the first chromaticity.

Example AB

The method of Example W or any of the preceding or subsequent method examples, further including sensing one or more illumination conditions, and in which providing the second light comprises adjusting at least one of an intensity and a chromaticity of the second light in response to the illumination conditions.

Example AC

The method of Example AB or any of the preceding method examples, in which providing the first light comprises adjusting at least one of an intensity and a chromaticity of the first light in response to the illumination conditions.

The foregoing is provided for purposes of illustrating, explaining, and describing embodiments of the present invention. Further modifications and adaptations to these embodiments will be apparent to those skilled in the art and may be made without departing from the scope or spirit of the invention. Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the invention.

What is claimed is:
1. A luminaire, comprising:
a housing;
a luminous zone coupled with the housing, wherein the luminous zone is characterized by a luminous zone area; and
one or more transition zones coupled with the housing and disposed adjacent to the luminous zone; wherein:

the one or more transition zones are characterized by a transition zone area that is at least three times the luminous zone area;

the luminous zone provides a first light to an illuminated area; and the one or more transition zones provide a second light to the illuminated area.

2. The luminaire of claim 1, wherein the one or more transition zones surround the luminous zone, as viewed from within the illuminated area.

3. The luminaire of claim 1, wherein the luminous zone is characterized by a luminous zone area, the one or more transition zones are characterized by a transition zone area, and the transition zone area is less than or equal to the luminous zone area.

4. The luminaire of claim 1, wherein the luminous zone is characterized by a luminous zone area, the one or more transition zones are characterized by a transition zone area, and the transition zone area is greater than the luminous zone area.

5. The luminaire of claim 1, wherein the luminous zone is characterized by a luminous zone area, the one or more transition zones are characterized by a transition zone area, and the transition zone area is at least ten times the luminous zone area.

6. The luminaire of claim 1, wherein the luminaire comprises an arrangement of light emitters that form the luminous zone and the one or more transition zones, wherein a first subset of the light emitters forms the luminous zone and a second subset of the light emitters forms the one or more transition zones.

7. The luminaire of claim 6, wherein the first subset of the light emitters is of a first type, and at least some of the second subset of the light emitters are of a second type that is different from the first type.

8. The luminaire of claim 7, wherein the first subset of the light emitters is characterized by a first chromaticity, and the second subset of the light emitters is characterized by a second chromaticity that is different from the first chromaticity.

9. The luminaire of claim 6, wherein:
the first subset and the second subset of the light emitters are of the same type as one another;
the first subset of the light emitters is powered by one or more first drive circuits; and
the second subset of the light emitters is powered by one or more second drive circuits.

10. The luminaire of claim 9, wherein:
the one or more first drive circuits provide a first level of drive conditions to the first subset of the light emitters; and
the one or more second drive circuits provide a second level of drive conditions to the second subset of the light emitters, the second level being in a fixed ratio with respect to the first level.

11. A luminaire, comprising:
a housing;
a luminous zone coupled with the housing, wherein a first subset of light emitters forms the luminous zone; and
one or more transition zones coupled with the housing and disposed adjacent to the luminous zone, wherein a second subset of light emitters forms the one or more transition zones;
the first subset and the second subset of the light emitters are of the same e as one another;
the first subset of the light emitters is powered by one or more first drive circuits;
the second subset of the light emitters is powered by one or more second drive circuits;
the luminous zone provides a first light to an illuminated area; and
the one or more transition zones provide a second light to the illuminated area, wherein:
the one or more first drive circuits provide a first level of drive conditions to the first subset of the light emitters; and
the one or more second drive circuits provide a second level of drive conditions to the second subset of the light emitters, the second level being in an adjustable ratio with respect to the first level.

12. The luminaire of claim 11, further comprising a controller that adjusts the adjustable ratio based on time of day.

13. The luminaire of claim 11, further comprising a controller and a light sensor, and wherein the controller adjusts the adjustable ratio based at least in part on an illumination condition sensed by the light sensor.

14. The luminaire of claim 13, wherein the light sensor is disposed so as to sense the illumination condition within the illuminated area.

15. The luminaire of claim 13, wherein the light sensor is disposed so as to sense the illumination condition outside of the illuminated area and does not sense light emitted by the luminaire.

16. The luminaire of claim 6, wherein:
the first subset and the second subset of the light emitters are of the same type as one another; and
an identification of at least a portion of the light emitters as being in the first subset or the second subset is adjustable.

17. The luminaire of claim 16, wherein the light emitters identified as being in the first subset or the second subset are adjustable based on time of day.

18. The luminaire of claim 16, further comprising a light sensor, and wherein the light emitters identified as being in the first subset or the second subset are adjustable based at least in part on an illumination condition sensed by the light sensor.

19. The luminaire of claim 1, wherein the luminous zone includes one or more light emitters, and the one or more transition zones comprise one or more reflectors disposed adjacent to the one or more light emitters.

20. The luminaire of claim 19, wherein one or more of the reflectors comprises a convex surface.

21. The luminaire of claim 19, wherein one or more of the reflectors comprises a concave surface.

22. A luminaire, comprising:
a housing;
a luminous zone coupled with the housing;
a lens coupled with the housing, and
one or more transition zones coupled with the housing and disposed adjacent to the luminous zone; wherein:
the luminous zone provides a first light to an illuminated area;
the one or more transition zones provide a second light to the illuminated area,
a central portion of the lens corresponds with the luminous zone, and
a peripheral portion of the lens corresponds with one of the one or more transition zones.

23. The luminaire of claim 22, wherein the peripheral portion of the lens comprises at least one of a diffusive surface, a phosphor and a filter to form the one or more transition zones.

24. A luminaire, comprising:
a housing;
a luminous zone coupled with the housing; and
one or more transition zones coupled with the housing and disposed adjacent to the luminous zone;
a waveguide; and
one or more light emitters that emit light into the waveguide, and wherein:
the luminous zone provides a first light to an illuminated area;
the one or more transition zones provide a second light to the illuminated area;
a central portion of the waveguide corresponds the luminous zone, and
a peripheral portion of the waveguide corresponds with at least one of the one or more transition zones.

25. The luminaire of claim 24, wherein differing light extraction features of the waveguide define the luminous zone and the at least one of the one or more transition zones.

26. The luminaire of claim 1, wherein the luminaire uses sunlight to provide the first light.

27. The luminaire of claim 26, wherein the luminaire uses sunlight to provide at least part of the second light.

28. The luminaire of claim 26, wherein the luminaire uses an artificial light emitter to provide at least part of the second light.

29. A luminaire, comprising:
a housing;
a luminous zone coupled with the housing; and
one or more transition zones coupled with the housing and disposed adjacent to the luminous zone;
wherein:
the luminous zone provides a first light to an illuminated area;
the one or more transition zones provide a second light to the illuminated area;
the housing comprises a top plate portion coupled with a light-diffusing surface extending downwardly from the top plate portion, so as to form a downward-facing cavity;
one or more light emitters couple with an underside of the top plate portion; and
a lens couples with the top plate surface such that the lens and the top plate portion enclose the one or more light emitters;
such that the lens forms the luminous zone and the light-diffusing surface forms the one or more transition zones.

30. A method of illuminating an area, comprising:
providing a first light to the area, at a first intensity, from a luminous zone of a luminaire; and
providing a second light to the area, at a second intensity, from one or more transition zones disposed adjacent to the luminous zone within the luminaire, wherein:
at a first time of day, the first intensity is greater than the second intensity; and
at a second time of day, the second intensity is substantially equal to the first intensity.

31. The method of claim 30, wherein providing the second light comprises providing the second light with one of:
a net light output that is less than a net light output of the first light;
a luminous flux per unit area that is less than a luminous flux per unit area of the first light, and
a chromaticity having a lower correlated color intensity than a chromaticity of the first light.

32. The method of claim 30, wherein providing the first light comprises providing the first light with a first chromaticity, and providing the second light comprises providing the second light with a second chromaticity that is different from the first chromaticity.

33. A method of illuminating an area, comprising:
providing a first light to the area from a luminous zone of a luminaire; and
providing a second light to the area from one or more transition zones disposed adjacent to the luminous zone within the luminaire, wherein:
providing the first light comprises providing the first light with a first chromaticity;
providing the second light comprises providing the second light with a second chromaticity;
at a first time of day, the second chromaticity is different from the first chromaticity; and
at a second time of day, the second chromaticity is substantially the same as the first chromaticity.

34. The method of claim 30, further comprising sensing one or more illumination conditions, and wherein providing the second light comprises adjusting at least one of an intensity and a chromaticity of the second light in response to the illumination conditions.

35. The method of claim 34, wherein providing the first light comprises adjusting at least one of an intensity and a chromaticity of the first light in response to the illumination conditions.

* * * * *